(12) United States Patent
Hrncir et al.

(10) Patent No.: US 9,683,874 B2
(45) Date of Patent: Jun. 20, 2017

(54) UNIVERSAL MOUNTING HEAD CONSTRUCTION FOR LIQUID LEVEL TRANSDUCERS AND THE LIKE

(71) Applicant: Texas LFP, LLC, Dallas, TX (US)

(72) Inventors: Robert E. Hrncir, Irving, TX (US); Gagik Farmanyan, Plano, TX (US)

(73) Assignee: Texas LFP, LLC, Dallas, TX (US)

(*) Notice: Subject to any disclaimer, the term of this patent is extended or adjusted under 35 U.S.C. 154(b) by 108 days.

(21) Appl. No.: 14/605,659

(22) Filed: Jan. 26, 2015

(65) Prior Publication Data

US 2016/0215910 A1  Jul. 28, 2016

(51) Int. Cl.
| | |
|---|---|
| G01D 11/30 | (2006.01) |
| G01D 11/24 | (2006.01) |
| G01F 23/64 | (2006.01) |
| G01F 23/72 | (2006.01) |
| G01F 23/74 | (2006.01) |

(52) U.S. Cl.
CPC ............ *G01D 11/30* (2013.01); *G01D 11/245* (2013.01); *G01F 23/64* (2013.01); *G01F 23/72* (2013.01); *G01F 23/74* (2013.01)

(58) Field of Classification Search
CPC ...... G01D 11/30; G01D 11/245; F16L 41/007
USPC .......................................... 73/319, 321, 322
See application file for complete search history.

(56) References Cited

U.S. PATENT DOCUMENTS

| | | | |
|---|---|---|---|
| 4,651,701 A | 3/1987 | Weaver | |
| 4,972,875 A | 11/1990 | Beer et al. | |
| 5,272,918 A | 12/1993 | Gaston et al. | |
| 5,398,659 A | 3/1995 | Zimmerman et al. | |
| 5,762,049 A | 6/1998 | Jones et al. | |
| 5,782,223 A | 7/1998 | Yamashita et al. | |
| 5,992,394 A | 11/1999 | Mukaidani et al. | |
| 6,408,692 B1* | 6/2002 | Glahn | G01F 23/303 340/450.2 |
| 8,511,716 B2* | 8/2013 | Brandt | F16L 5/027 285/140.1 |
| 2006/0099839 A1* | 5/2006 | Ishida | F16L 41/007 439/157 |
| 2007/0186648 A1* | 8/2007 | Harmon | G01F 23/72 73/319 |
| 2011/0037252 A1* | 2/2011 | Brandt | F16L 5/027 285/139.3 |

* cited by examiner

*Primary Examiner* — Peter Macchiarolo
*Assistant Examiner* — Nathaniel Kolb
(74) *Attorney, Agent, or Firm* — Alvin R. Wirthlin

(57) ABSTRACT

A liquid level transducer includes a mounting head connectable to a tank, a probe assembly extending into the tank, and a hose connecting assembly positioned on the mounting head outside of the tank. The probe assembly can include liquid withdrawal and return tubes and a sensor tube for determining the level of liquid within the tank. Bores are formed in the mounting head in alignment with the liquid withdrawal, return, and sensor tubes. First retaining features at least partially surround the withdrawal/return bores. The hose connecting assembly includes hose connectors with bases that have second retaining features that cooperate with the first retaining features so that the hose connectors can be aligned with the bores and adjusted to different angular positions about the central axes of the bores during assembly.

19 Claims, 17 Drawing Sheets

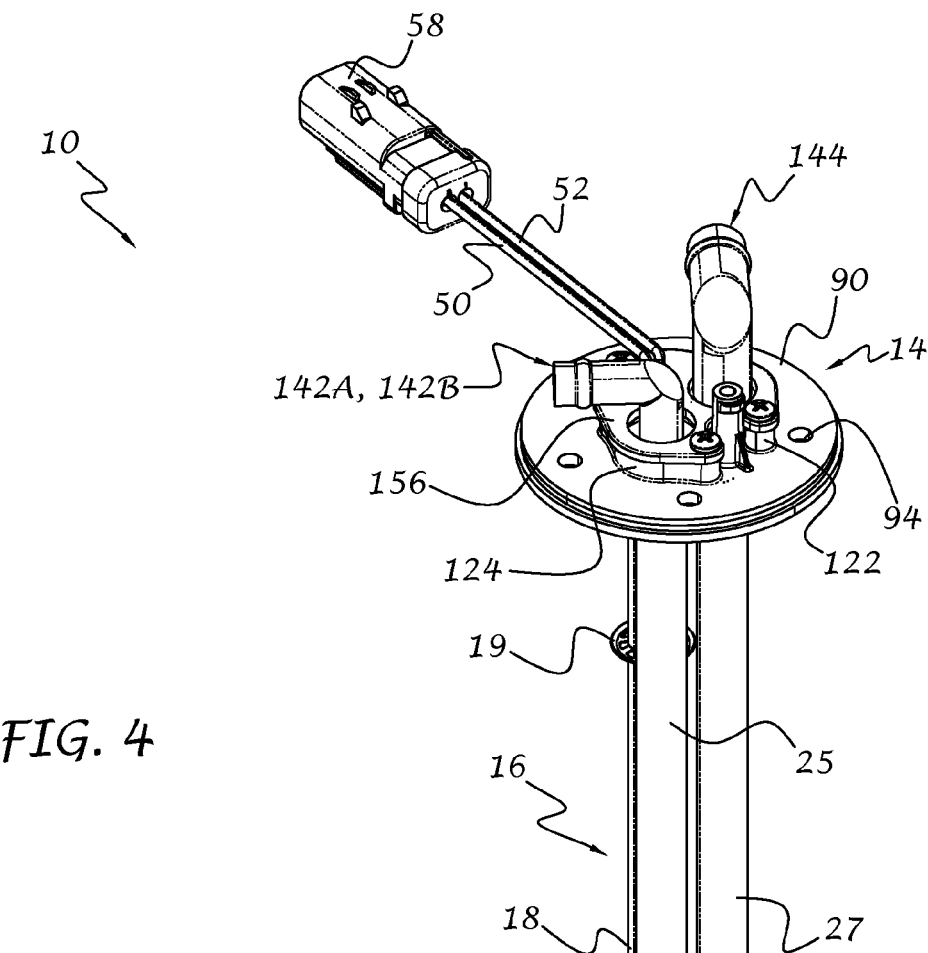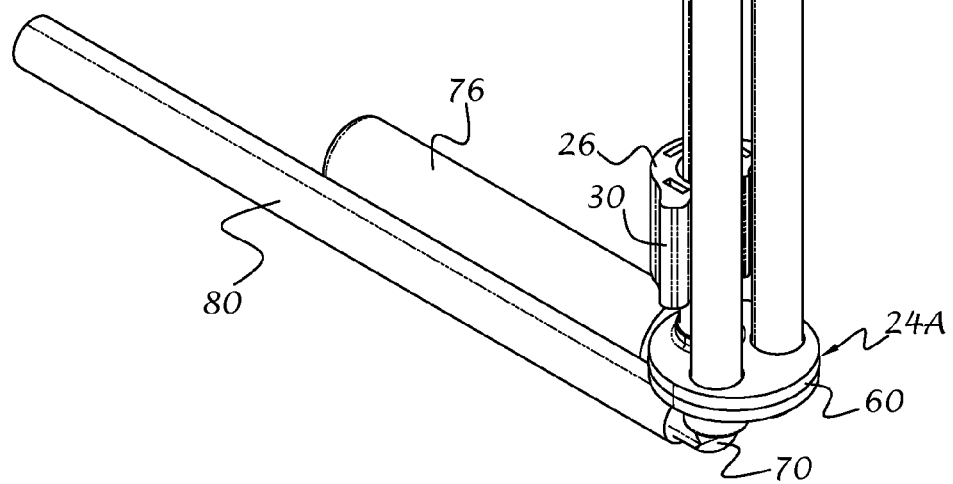
FIG. 4

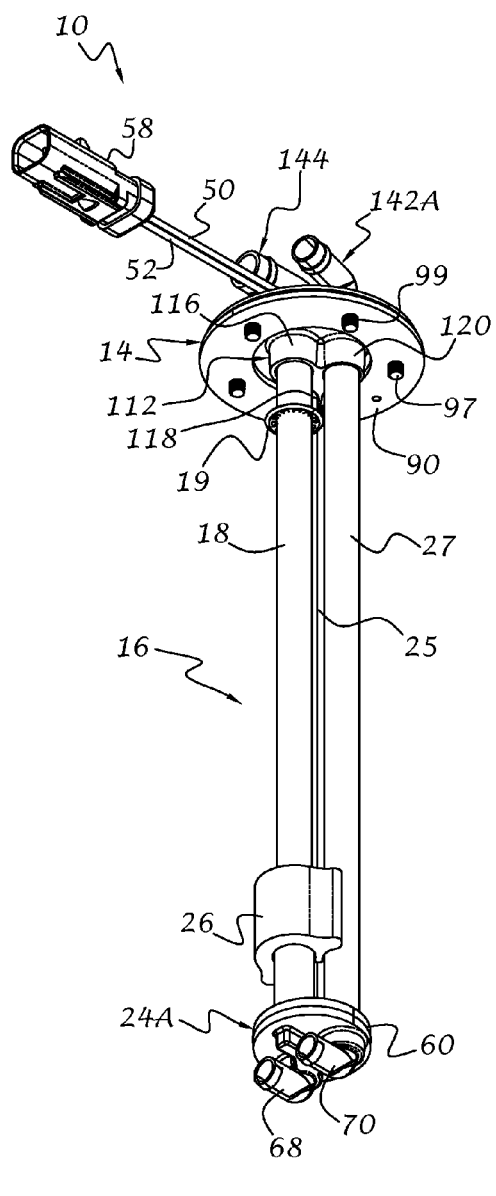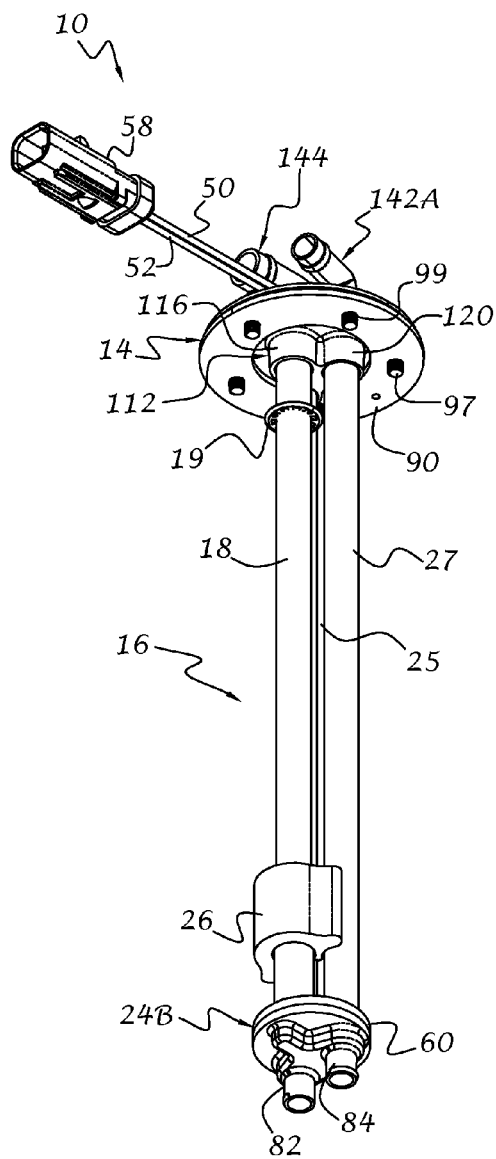
FIG. 5                    FIG. 6

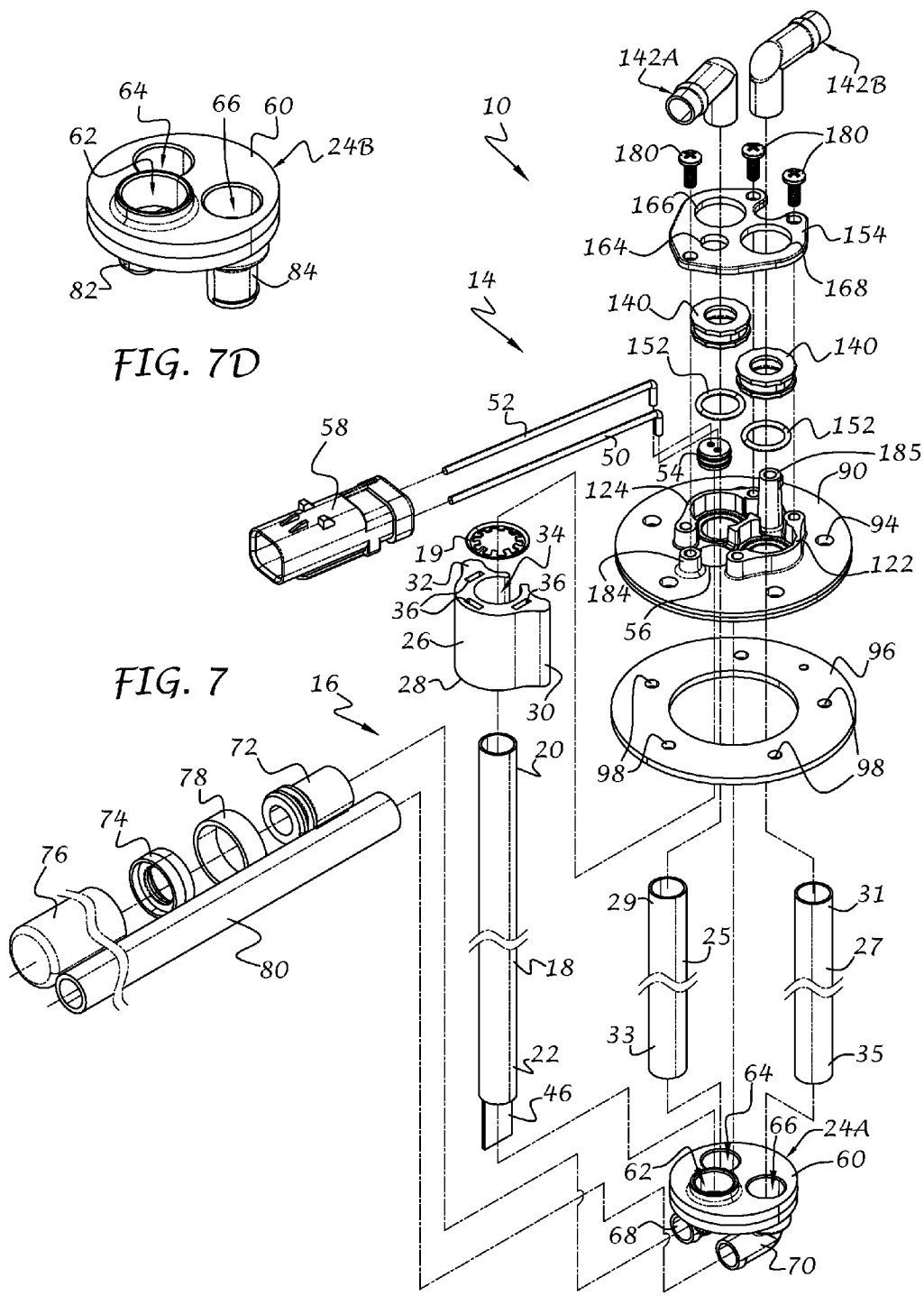

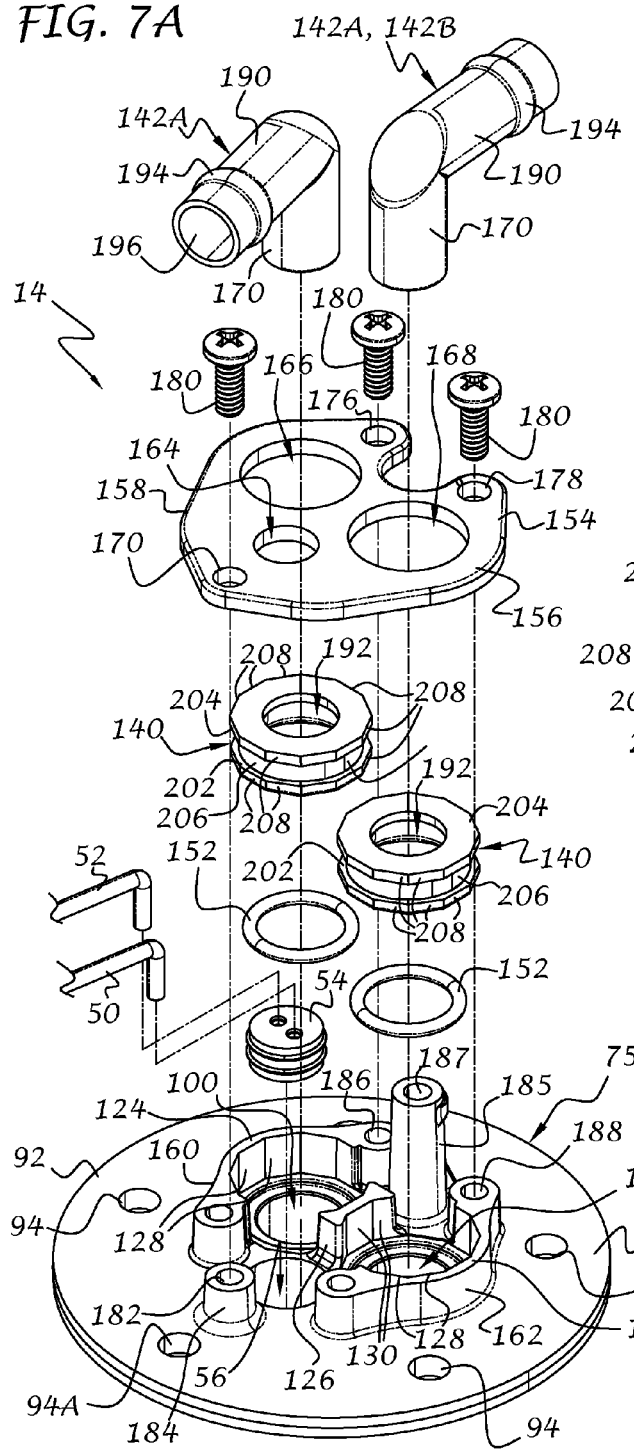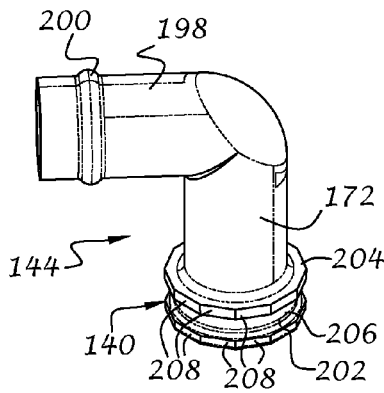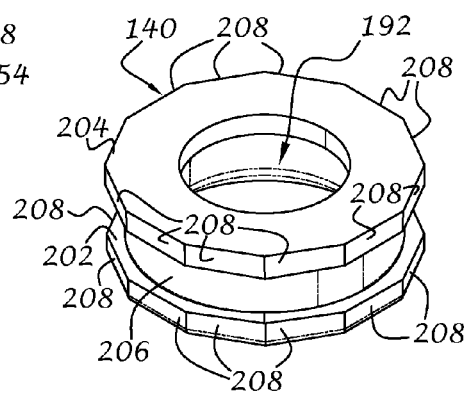

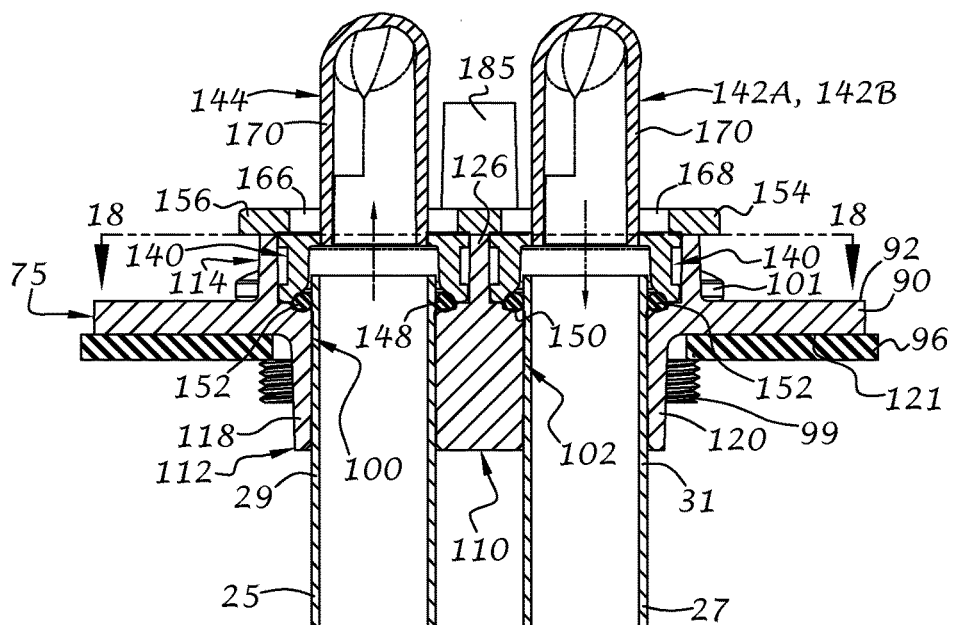
FIG. 9
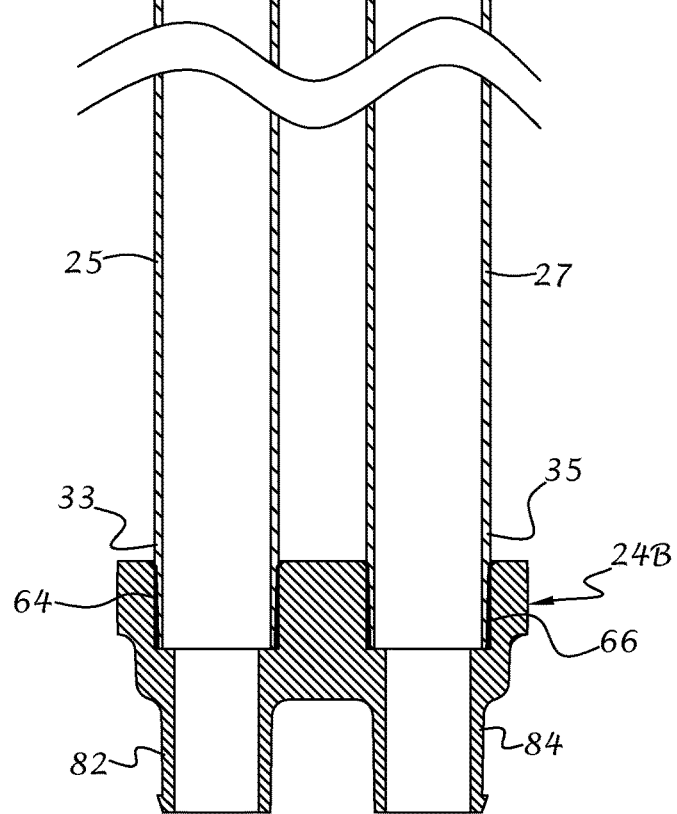

UNIVERSAL MOUNTING HEAD CONSTRUCTION FOR LIQUID LEVEL TRANSDUCERS AND THE LIKE

BACKGROUND OF THE INVENTION

This invention relates to liquid level and liquid withdrawal and return systems, and more particularly to a universal mounting head for accommodating a wide variety of tank configurations and hose connection requirements for mounting heads associated with liquid level transducers and liquid withdrawal and return assemblies.

Transducers for measuring liquid level are often used in vehicles, industrial equipment, as well as other mobile and stationary systems and components. The electrical output of such transducers varies in response to a change in the liquid level being measured and is typically in the form of a change in resistance, capacitance, current flow, magnetic field, and frequency. These types of transducers may include variable capacitors or resistors, optical components, Hall Effect sensors, strain gauges, ultrasonic devices, reed switch arrays, and so on.

For reed switch-type devices, a plurality of reed switches are usually arranged in series with a plurality of resistors along the length of a circuit board. The reed switches are normally responsive to the presence and absence of a magnetic field for opening and/or closing the switch. A float rides along the surface of the liquid to be measured and is constrained to move in a linear direction along the circuit board. The float usually includes an embedded magnet to trip one of the reed switches as the float moves in response to a change in liquid level in the tank. Thus, the resistance of the circuit, which is indicative of liquid level, depends on the position of the float and the particular reed switch that has been tripped.

No matter what sensing technology is used, liquid withdrawal and return fixtures are often associated with the transducer. Such fixtures typically include hose connectors in fluid communication with conduits that extend into the tank. Hoses or lines are connected to the fixtures so that liquid, such as fuel, can be withdrawn from the tank and transported to an engine at a remote location, with any unused fuel being returned to the tank, for example. The hose connectors are typically fixed in position, may be of different sizes, and cannot be adjusted to accommodate different requirements associated with a particular tank configuration, space limitations associated with the tank and/or machine or system to which the tank is connected, and so on. Thus, different mounting heads are required for accommodating each set of requirements, leading to excessive manufacturing costs, assembly time, and excess inventory associated with different molds, castings, fixtures, and so on.

Accordingly, it would be desirable to provide a universal mounting head for liquid level transducers and liquid withdrawal and return assemblies, either alone or in combination, to thereby accommodate a large variety of different requirements associated with different tank configurations, space limitations associated with the tank and/or machine or system to which the tank is connected, and so on.

SUMMARY OF THE INVENTION

In accordance with one aspect of the invention, a mounting head assembly adapted for connection to a tank for conducting liquid between the tank and a location remote from the tank includes a support member adapted for connection to the tank, the support member having a first bore with a first central axis extending therethrough for conducting the liquid between the tank and the remote location, a connecting body including an upper connecting portion with a first set of first restraining features at least partially surrounding the first bore, and a first hose connector including a first base portion and a first connector portion extending at an angle with respect to the first base portion. The first base portion includes a first set of second restraining features for cooperating with the first restraining features so that the connector portion can be oriented in one of a plurality of angular positions with respect to the central axis and fixed in place during assembly.

In accordance with a further aspect of the invention, a second hose connector is provided and includes a second base portion and a second connector portion extending at an angle with respect to the second base portion. The second base portion has a second set of second restraining features for cooperating with the first set of first restraining features so that the first and second hose connectors are interchangeable with respect to the upper connection portion.

In accordance with another aspect of the invention, the support member includes a second bore with a second central axis extending through the support member, a second set of first restraining features at least partially surrounding the second bore for cooperating with at least one of the first and second sets of first restraining features so that the first and second hose connectors can be oriented independently of each other about the first and second central axes, respectively, at a plurality of discrete angular positions and fixed in place at one of the plurality of discrete angular positions during assembly, such that the first connector portion extends at a first angular position and the second connector portion extends at a second angular position.

In accordance with a further aspect of the invention, a transducer for determining the level of liquid within a tank utilizing the mounting head assembly as described above includes a third bore extending through the mounting member, and a probe assembly extending from the connecting body and being adapted to extend into the tank when the mounting head assembly is connected thereto. The probe assembly includes a first tube extending from the connecting body for fluid communication with the first bore and the first hose connector, a second tube extending from the connecting body for fluid communication with the second bore and the second hose connector, a third tube extending from the connecting body for fluid connection with the third bore, and a sensor assembly associated with the third tube for electronically detecting the level of liquid within the tank. The sensor assembly communicates electrical signals reflective of the liquid level through the third bore to thereby monitor the liquid level condition of the tank.

In accordance with yet a further aspect of the invention, a method of assembling a mounting head adapted for connection to a tank for conducting liquid between the tank and a location remote from the tank includes: providing a support member adapted for connection to the tank, the support member having a first bore extending therethrough for conducting the liquid between the tank and the remote location, the first bore having a first central axis; providing a first set of first restraining features that at least partially surround the first bore; providing a first hose connector including a first base portion and a first connector portion extending at an angle with respect to the first base portion; providing a first set of second restraining features on the first base portion for cooperating with the first set of first restraining features; and installing the first hose connector on the support member by: a) adjusting the first hose connector such that the second restraining features are in alignment with the first restraining features in one of a plurality of alignment conditions so that the first connector portion is positioned in one of a plurality of corresponding angular positions with respect to the support member; and b) fixing the first hose connector in the one angular position.

The mounting head referred to throughout the specification can be associated with a liquid withdrawal and return system for removing and returning liquid to the tank, and can also be associated with a liquid level transducer with sensing features for determining the level of liquid within the tank.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein:

FIG. 4 is a top rear isometric view thereof;

FIG. 5 is a bottom left isometric view thereof with lower components removed to show a first lower connection portion in accordance with the invention;

FIG. 6 is a bottom left isometric view thereof with lower components removed to show a second lower connection portion in accordance with the invention;

FIG. 7 is a top left exploded isometric view of the liquid level transducer in accordance with the invention;

FIG. 7A is an enlarged left exploded isometric view of the mounting head assembly of FIG. 7;

FIG. 7B is an enlarged isometric top view of a tube connector that forms part of the liquid level transducer in accordance with one exemplary embodiment of the invention;

FIG. 7C is an enlarged isometric view of a hose connector base in accordance with an exemplary embodiment of the invention that forms part of the tube connectors of FIGS. 7, 7A and 7B;

FIG. 7D is an enlarged isometric top view of the second lower connection portion that can replace the first lower connection portion in accordance with the invention;

FIG. 9 is a sectional view thereof taken along line 9-9 of FIG. 8;

Figure 1:
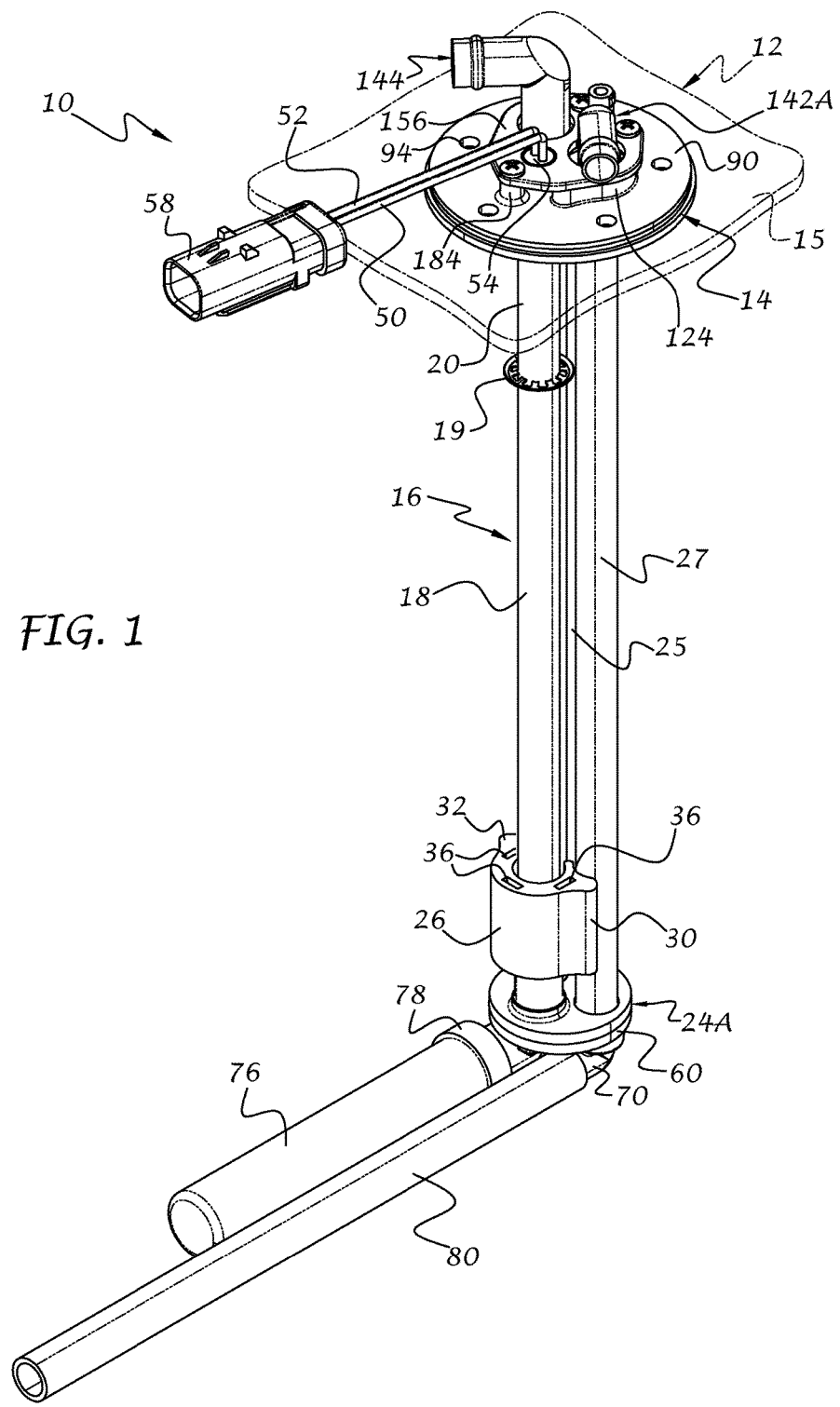
FIG. 1 is a top left isometric view of a liquid level transducer in accordance with the present invention.
Figure 2:
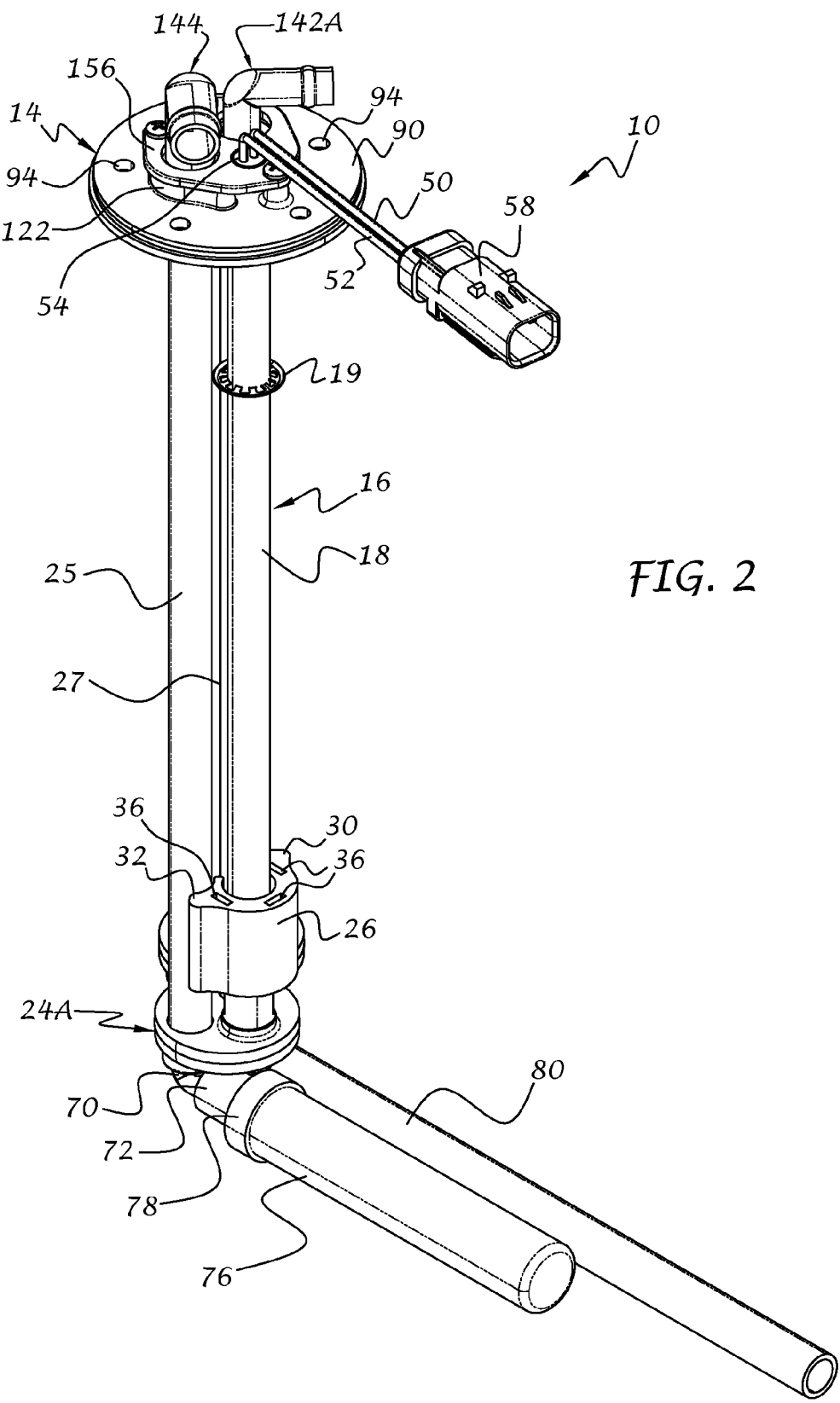
FIG. 2 is top right isometric view thereof.
Figure 3:
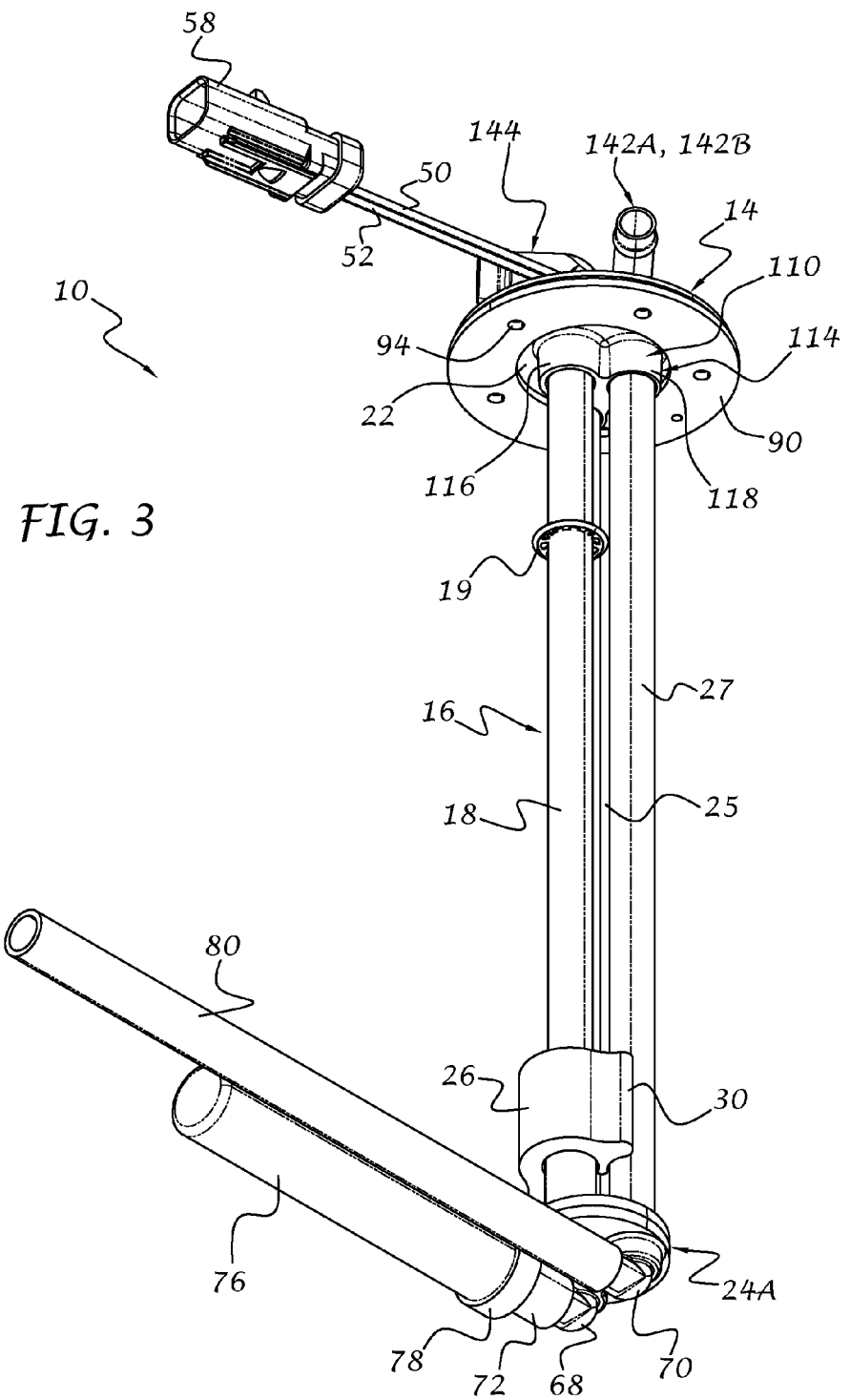
FIG. 3 is a bottom left isometric view thereof.
Figure 8:
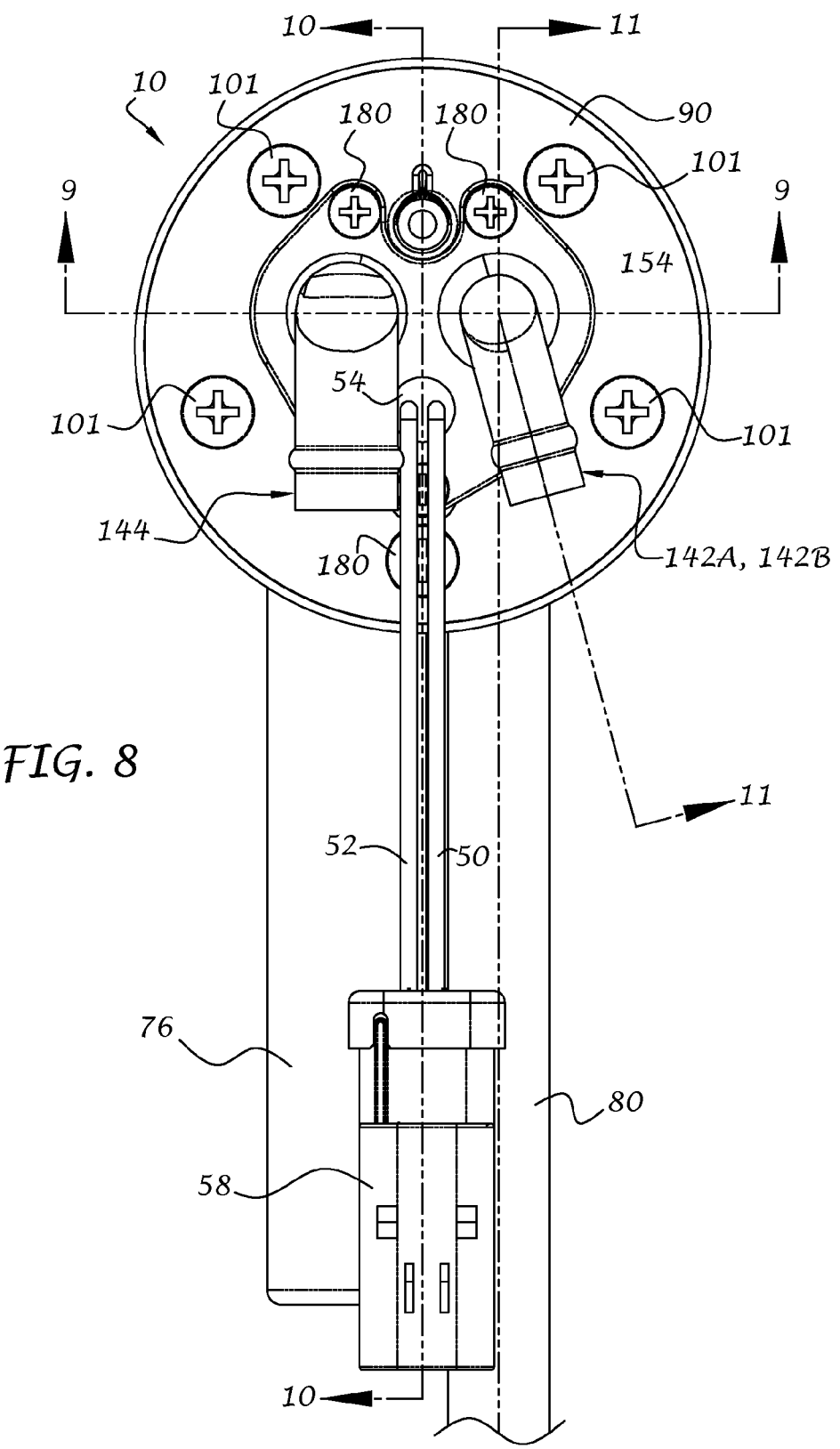
FIG. 8 is an enlarged top plan view of the liquid level transducer.

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring now to the drawings, and to FIGS. 1-4 in particular, a liquid level transducer 10 in accordance with an exemplary embodiment of the present invention is illustrated. The liquid level transducer 10 preferably has a mounting head assembly 14 that connects to a tank 12 (shown in phantom line in FIG. 1), and a probe assembly 16 that extends into the tank 12 form the mounting head assembly 14. The tank can be a fuel tank to hold liquid fuel or gaseous fuel in a liquid state (such as propane, LPG, etc.), an oil reservoir, radiator, brake fluid chamber, diesel exhaust fluid (DEF) for SCR systems, or any other tank or container associated with a vehicle, machine or other system for holding and/or transporting a liquid (not shown) where it is desirous to determine the level of liquid within the tank and/or withdraw the liquid from the tank and return any unused liquid back into the tank after passing through the system via a pump or the like in a well-known manner. The present invention is especially suitable for fuel tanks associated with heavy-duty transportation trucks, light-duty passenger vehicles, farm and construction equipment, airplanes, boats, electrical generators, and so on, that are powered with gasoline, kerosene, diesel, propane or other liquefied gas, etc. It will be understood that the afore-mentioned vehicles, machines, and systems are given by way of example only as the invention can be used in a wide variety of vehicles, machines, and systems without departing from the spirit and scope of the invention.

Although the transducer 10 is shown in the drawings with a vertical orientation, it will be understood that the transducer 10 can be configured for mounting in a horizontal orientation or any other suitable angle or orientation, without departing from the spirit and scope of the invention, such angle or orientation being dependent at least partially upon space constraints as dictated by the structure of the vehicle, machine, etc., with respect to the tank 12 and/or the particular shape and mounting requirements of the tank 12.

The mounting head assembly 14 and probe assembly 16 include, in accordance with the invention, unique structure to accommodate both the measurement of liquid level within the tank and the ability to configure the mounting head assembly 14 and the probe assembly 16 with a wide variety of differently configured interchangeable modular components that can be oriented at different angular positions with respect to the mounting head assembly 14 to thereby accommodate a wide variety of different tank configurations and system requirements associated with the tank.

With additional reference to FIGS. 7-14, the probe assembly 16 will first be described and, in accordance with an exemplary embodiment of the invention, senses liquid level in a linear direction and includes in a first tube 18, which functions as a sensor tube or housing that isolates sensors from the contents of the tank, with an upper end 20 that extends into the mounting head assembly 14 and a lower end 22 that extends into either a first lower support member 24A (FIGS. 5 and 7) or a second lower support member 24B (FIGS. 6 and 7B). The lower support members 24A, 24B are preferably modular in construction, in that they are readily interchangeable without the need to modify the shape, relative position or structure of the other components of the probe assembly 16. A second tube or conduit 25 and third tube or conduit 27 also have upper ends 29 and 31, respectively, that extend into the mounting head assembly 14 and lower ends 33 and 35, respectively, that extend into one of the first and second lower support members 24A or 24B. The second and third tubes 25, 27 can function as liquid withdrawal and return tubes, respectively, and vice-versa, or can be used for other purposes, such as additional sensor tubes, transporting coolant through a DEF tank, wiring conduits for in-tank pumps and other electronics, and so on. The second and third tubes are preferably similar in size and shape so that their positions are interchangeable, but may alternatively, in accordance with the invention, be of different sizes, shapes, and so on, in order to accommodate a wide variety of different systems, tanks, liquids, electronics, and so on. The tubes 18, 25, and 27 are preferably constructed of non-magnetic or magnetically inert materials, such as plastic, aluminum, ceramic, composites, and so on, but may be constructed of any suitable material when other sensor technologies are used for measuring liquid level.

It will be understood that one or more of the tubes 18, 25, and 27 with their accompanying structure and function can be eliminated without departing from the spirit and scope of the invention.

As best shown in FIG. 7, the probe assembly 16 also includes a magnetic float 26 with a cylindrically-shaped body 28 and first and second wings 30 and 32, respectively, that extend in opposite directions from the body 28. A central bore 34 is formed in the body 28 and is sized to receive the sensor tube 18 and the wings are shaped to extend around a portion of the tubes 25 and 27, so that the float slides freely along the sensor tube 18, as represented by arrow 35 in FIG. 10. The float 26 is preferably constructed of a closed-cell nitrile material, but may be constructed of other materials such as rubber, plastics, metal, and so on, without departing from the spirit and scope of the invention. It will be understood that the term "cylindrical" as well as its derivatives as may be used throughout the specification are given by way example only since the magnetic float, sensor tube 18, as well as other cylindrically-shaped structure as shown throughout the drawing figures can be configured with other shapes such as square, triangular, and so on. Thus, the invention is not limited to sensor tubes, floats, mounting heads, and other components of the liquid level transducer 10 that are circular in cross section, but can encompass any suitable cross sectional shape.

Figure 10:
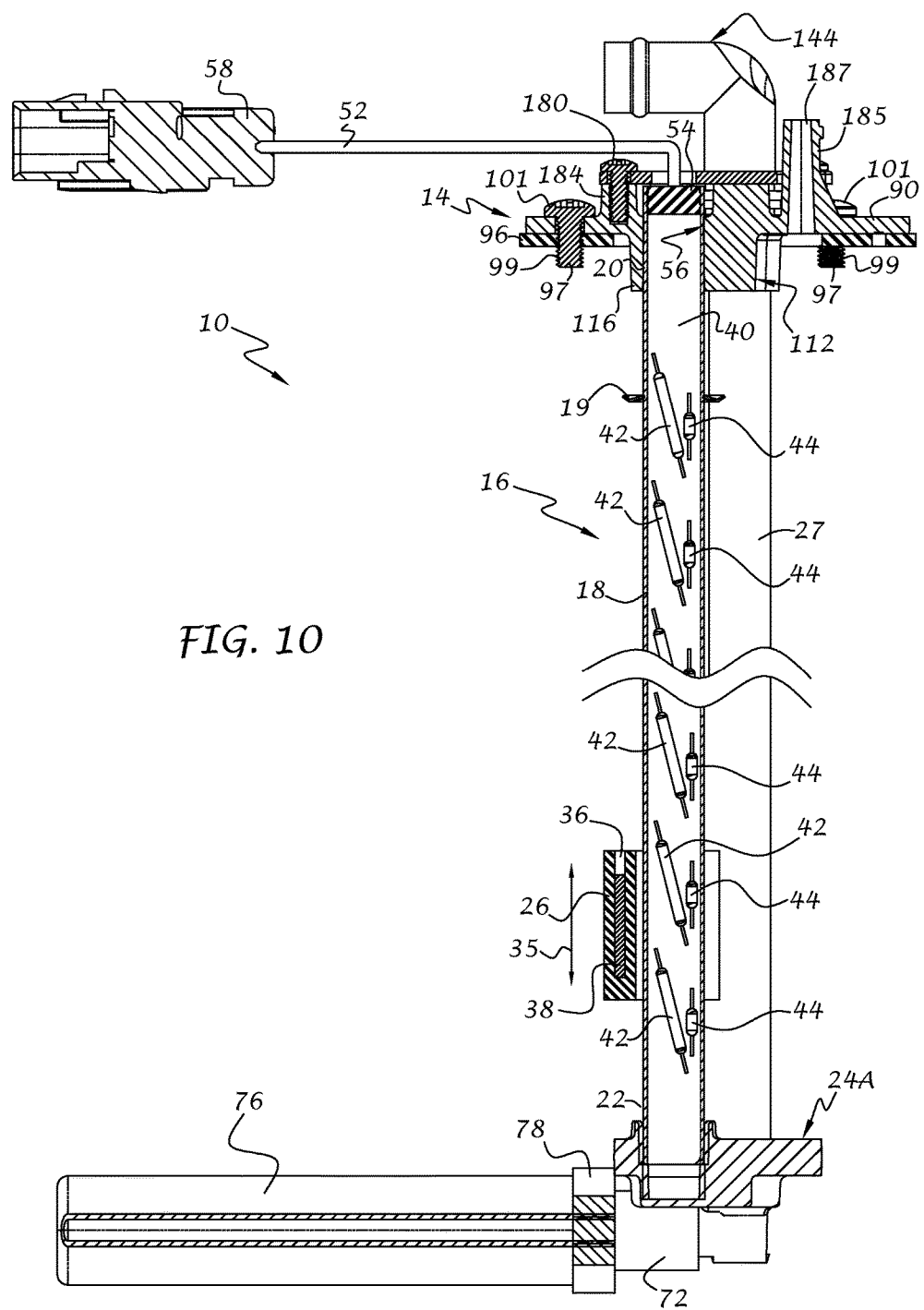
FIG. 10 is a sectional view thereof taken along line 10-10 of FIG. 8.
Figure 11:
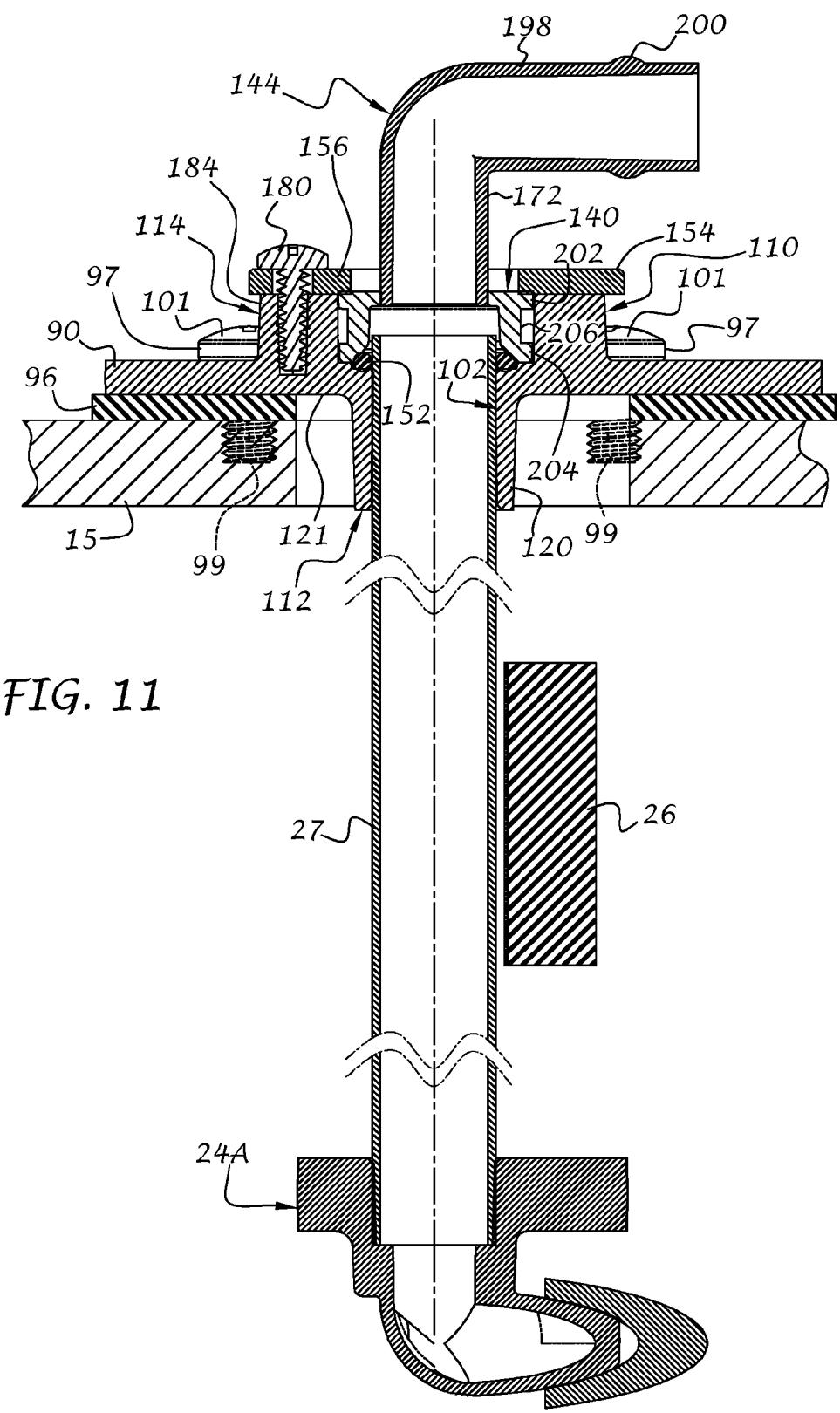
FIG. 11 is a sectional view thereof taken along line 11-11 of FIG. 8.
Figure 12:
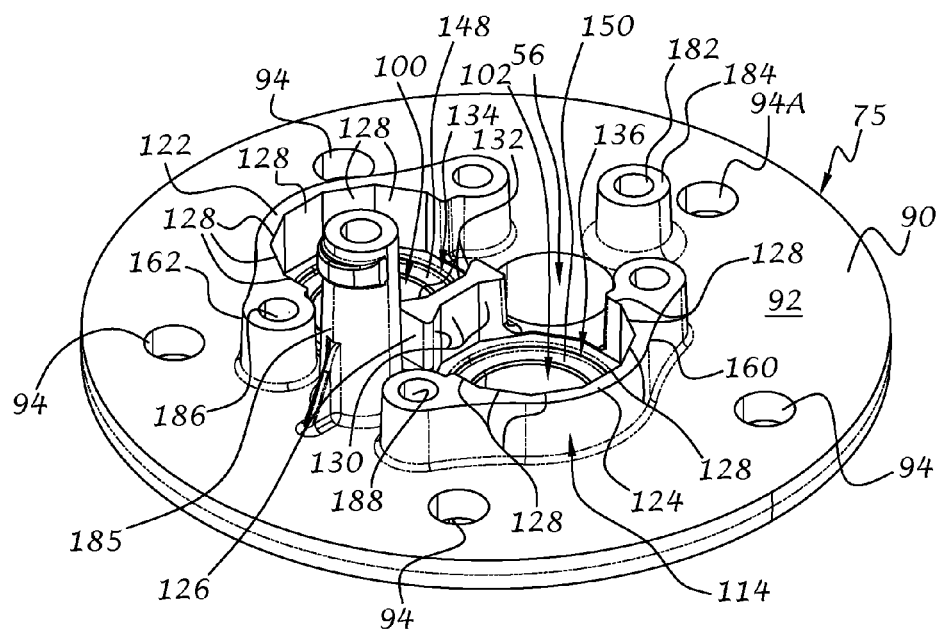
FIG. 12 is a top isometric view of a mounting head portion of the liquid level transducer in accordance with the invention.
Figure 13:
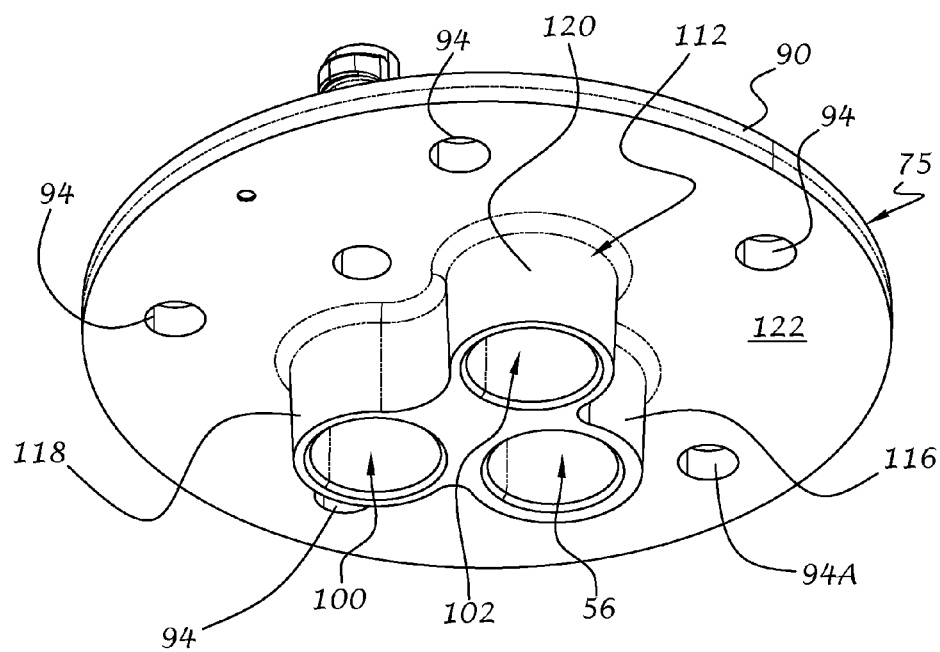
FIG. 13 is a bottom isometric view thereof.
Figure 14:
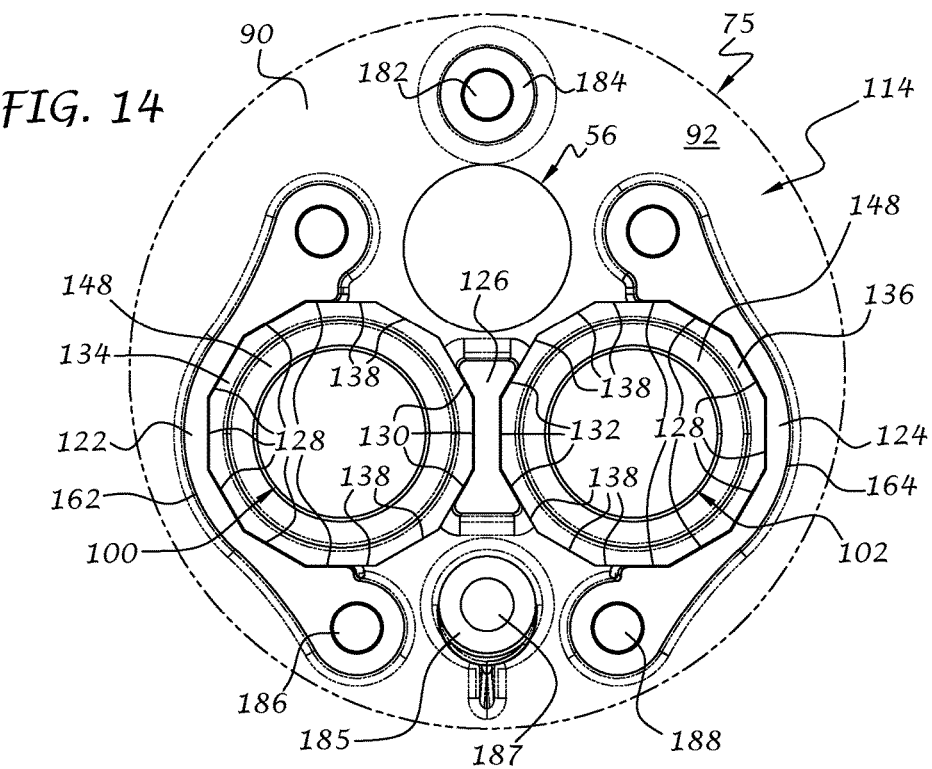
FIG. 14 is an enlarged top plan view of an upper connecting section of the mounting head.
Figure 15:
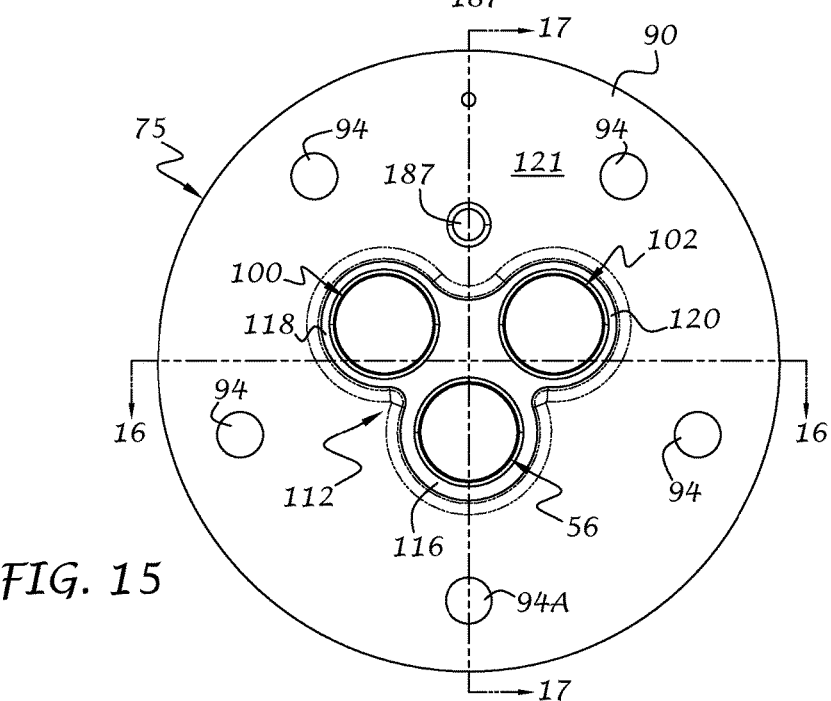
FIG. 15 is an enlarged bottom plan view of the mounting head.
Figure 16:
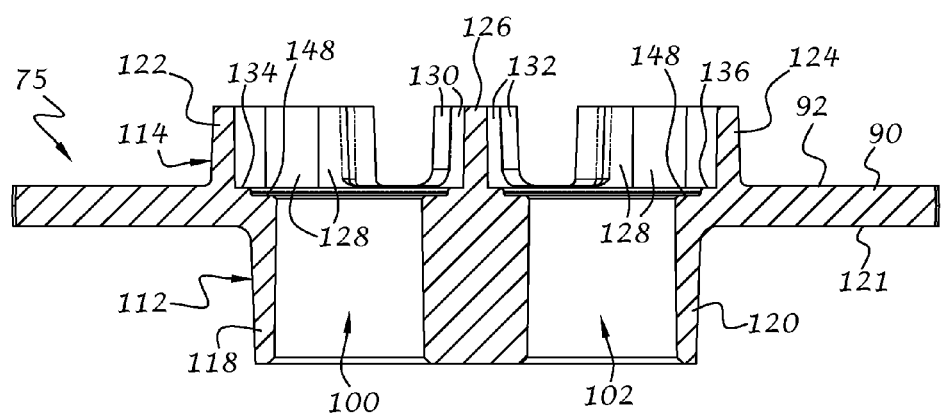
FIG. 16 is a sectional view thereof taken along line 16-16 of FIG. 15.
Figure 17:
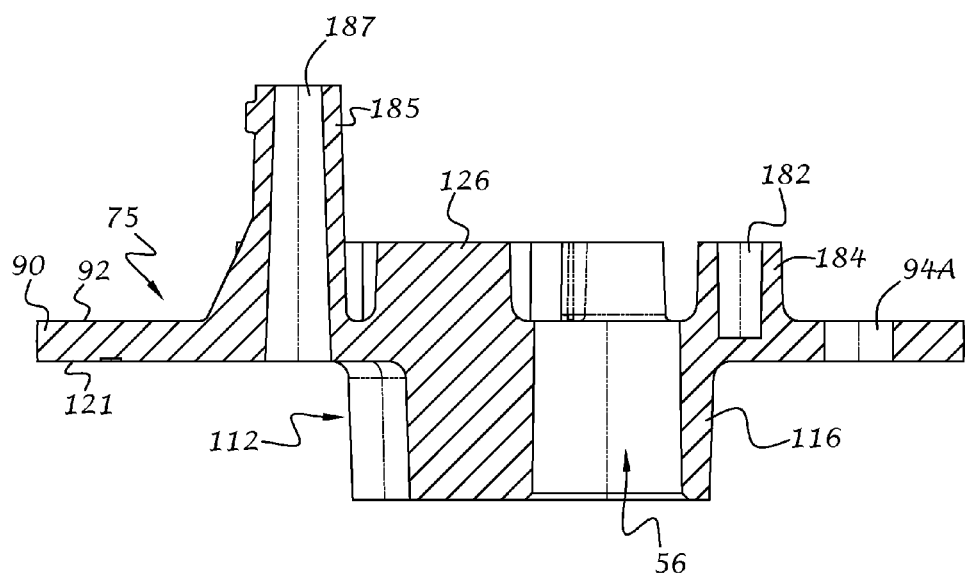
FIG. 17 is a sectional view thereof taken along line 17-17 of FIG. 15.

With reference to FIGS. 7 and 10, the float 26 preferably includes axially extending slots or openings 36 for receiving magnets 38 (FIG. 10). Preferably, the holes are circumferentially spaced approximately 120 degrees apart. However, it will be understood that more or less magnets located at different circumferential positions can be provided without departing from the spirit and scope of the invention. Preferably, each magnet is of a flat, elongate shape and can be slightly curved to accommodate the curvature of the float 26. Each magnet is preferably magnetized on its outer and inner faces such that magnetic flux lines of force are directed perpendicular with respect to the longitudinal extend of the magnet and toward the center of the opening 34 of the float 26. The magnets are preferably constructed of a ceramic hard ferrite material. However, it will be understood that the magnets can be constructed of other materials.

The sensor tube 18 is preferably constructed of a non-magnetic material such as plastic, aluminum, composites, and so on. The lower support member (24A or 24B) preferably serves as a lower resting support for the float 26 in the event of a very low liquid level or empty condition of the tank. Likewise, an upper stop 19, is annular in shape and surrounds the sensor tube 18 at the upper end 20 thereof to prevent further upward movement of the float 26 when the liquid level in the tank is at or above a predetermined level, such as at a full tank level.

As best shown in FIG. 10, a sensor board 40, preferably in the form of a printed circuit board (PCB), is located in the sensor tube 18 and preferably extends along a substantial length thereof. A plurality of normally-open reed switches 42 are preferably located along the length of the PCB 36 in series with a plurality of resistors 44. The reed switches are preferably oriented at an acute angle with respect to a longitudinal axis of the sensor tube 18 and are responsive to the magnetic float 26 for creating a liquid level signal, in conjunction with the resistors, as the float rides along the sensor tube 18 in response to a change in liquid level within the tank. It will be understood that normally closed reed switches can be used without departing from the spirit and scope of the invention. Although not shown, insulating material, such as heat-shrink tubing, potting material, and so on, can be located between the PCB 40 and the sensor tube 18 to insulate and protect the reed switches and other components against shock, vibration, and other harsh conditions to which the transducer 10 may be exposed. Although a particular number of reed switches, spacing between reed switches and the angle of the reed switches are shown, it will be understood that more or less reed switches can be provided at different angles and orientations without departing from the spirit and scope of the invention.

The arrangement of three magnets at 120 degrees apart around the circumference of the float 26 advantageously concentrates a large magnetic field at the center of the float opening 34, and thus effectively saturates one of the reed switches 42 that may be present within the opening 34 to thereby create a positive latching or closing effect. Once the float has moved above or below the reed switch, the reed switch will more effectively return to its normally open state due to the relatively low residual magnetic field at the upper and lower ends of the magnets. Thus, by magnetizing the relatively broad inner and outer faces of each magnet, and orienting them so that their flux lines are directed to the axial center of the float, the switching effect of the reed switches can be more closely controlled, thereby creating more reliable activation and deactivation of the reed switches. In this manner, the prior art disadvantages associated with inaccurate liquid level measurement due to false switching are substantially reduced. It will be understood that more than three magnets can be located around the circumference of the float without departing from the spirit and scope of the invention.

As shown in FIGS. 1, 2, 7, and 10, electrical wires 50 and 52 preferably extend from the sensor board 40 and through a strain relief or grommet 54 located in a first upper bore 56 of the mounting head assembly 14 and terminate at an electrical connector or plug 58 for receiving a complementary connector or plug (not shown) associated with further processing and/or display circuitry (not shown) of the vehicle, machine, system and so on, which the liquid level transducer 10 is associated. The grommet 54 is preferably constructed of an elastomeric material or the like to thereby seal around the wires 50 and 52 and the first upper bore 56 of the mounting head assembly 14.

In addition, although reed switches have been described with respect to this embodiment, it will be understood that other magnetic sensing devices can be used without departing from the spirit and scope of the invention. For example, other devices can include, but are not limited to, one or more solid state magnetic flux field sensors connected to the sensor board 40, Hall effect sensors, magnetoresistive (MR) sensors, anisotropic MR (AMR) sensors, giant magnetoresistance (GMR) sensors, solid state Micro-Electro-Mechanical Systems (MEMS), magnetic switches, as well as non-magnetic sensing technologies such as proximity detectors using capacitance, optical, or other measurement technologies, and so on. With the use of magnetic flux field or Hall effect sensors, a single sensor may be sufficient to determine the position of the magnet and thus the level of liquid within the tank depending on its length. Where the measurement length is too long for a single flux field sensor, a sufficient number of sensors placed at predetermined positions along the sensor board or on the surface of the sensor tube 18 itself can be used. In addition, when using a sensor that changes state in the presence and/or absence of a magnetic field, the magnets need not be arranged circumferentially as shown, nor is it an absolute requirement that three magnets be used, since one or more magnets may be adequate depending on the sensing technology used. Thus, the present invention is adaptable to a wide variety of liquid level sensing technologies.

Likewise, the actuator can be in the form of one or more magnets, LED's, optical fibers or other light source, or other contactless actuator/sensor arrangements to remotely change the electrical state of the sensor elements. In the event that optical sensors are used, the housing can be formed of a material that is translucent or transparent to the wavelength of the light source so that the sensor elements can readily detect movement of the light source as the liquid level in the container rises and falls.

Turning now to FIGS. 7, 7D, 5, and 6, the first lower support member 24A and second lower support member 24B will now be described. The lower support members 24A, 24B are somewhat similar in construction, and both have a generally cylindrical body 60 with a first lower bore 62 for receiving the lower end 22 of the first (sensor) tube 18, a second lower bore 64 for receiving the lower end 33 of the second tube 25, and a third lower bore 66 for receiving the lower end 35 of the third tube 27. The bores 62, 64, and 66 of the lower support member 24A are preferably located in the same position and are the same size as the respective lower bores 62, 64, and 66 of the lower support member 24B. The bores in each lower support member can be of the same diameter or cross dimension or may be of different diameters or cross dimensions depending on the outer diameters or cross dimensions of the tubes 18, 25, and 27. However, by constructing the first and second lower support members with the same features for receiving the tubes 18, 25 and 27, they are interchangeable. The first bore 62 preferably terminates in a sealed connection with the first (sensor) tube 18 so that the contents of the tank are isolated from the electronics within the tube 18. The second and third bores are normally in fluid communication with the contents of the tank so that the liquid can be withdrawn and returned to the tank. However, it will be understood that in some tanks, where heating of the contents within the tank may be needed, such as in the afore-mentioned DEF tanks, the second and third tubes may be in fluid communication with each other only, and not the contents of the tank, to permit antifreeze or other liquids to flow through the tank and warm its contents while being isolated from the tank contents.

The first lower support member 24A also includes first and second horizontal connectors or fittings 68 and 70 that are in fluid contact with their respective lower bores 64 and 66, and thus their respective tubes 25 and 27, and extend perpendicularly thereto. By way of example, the first and second connectors or fittings can be barb fittings with the first fitting 68 receiving an adaptor tube 72 for connection to a filter 76 via a filter flange 74 and an outer compression ring 78 that secures the components together. Thus, the second tube 25 functions as a withdrawal tube that extends horizontally in the tank (when the transducer 10 is mounted vertically) so that liquid within the tank passes through the filter 76, the upwardly through the withdrawal tube 25, and through the head assembly 14, as will be described in greater detail below. Likewise, a flow tube 80 is connected to the second horizontal fitting 70 near the bottom of the tank 8 and extends parallel with the filter 76 so that liquid returning from an engine associated with the vehicle, machine or system can be directed through the third tube 27, which functions as a return tube, and expelled into the tank via the flow tube 80. Although the fittings 68 and 70 are shown as perpendicular to their respective tubes 25 and 27 and thus the bores 64 and 66, it will be understood that the fittings can be arranged in any desired orientation.

For example, as shown in FIGS. 7D and 9, the second lower support member 24B includes connections or fittings 82 and 84 that are in fluid contact with their respective lower bores 64 and 66, and thus their respective tubes 25 and 27, and extend parallel thereto. Since the fittings 82 and 84 are similar in shape and size to the fittings 68 and 70, they can receive the same filter components and flow tube. It will be understood that other lower support members can be provided, within the purview of the invention, with different connector sizes, orientations, and fitting types.

Referring now to FIGS. 1, 2, and 7-17, the mounting head assembly 14 preferably includes a mounting head portion 75 with a generally disk-shaped upper support member 90, an outer periphery of which forms a mounting flange 92 with mounting apertures 94 and a lead mounting aperture 94A extending axially therethrough for mounting the transducer 10 to the wall 15 (FIG. 1) of the tank 12 or the like. The mounting apertures 94 and 94A are adapted to receive threaded studs (not shown) connected to the tank wall 15 and extending outwardly therefrom in a well-known manner.

During installation, the location of the transducer 10 is adjusted until the lead mounting aperture 94A is in alignment with a preselected stud and remaining mounting apertures 94 are in alignment with the remaining studs protruding from the tank wall. The transducer 10 is then pushed toward the tank wall 15 with the studs extending through corresponding mounting apertures 94. Nuts or other internally threaded components are then secured on the studs and torqued until the transducer 10 is secured on the wall 15. A gasket 96, shown in FIG. 7 as annular in shape, can be provided between the mounting flange 92 and the tank wall 15 (FIG. 1) for sealing the opening (not shown) in the tank wall through which the transducer 10 extends. The gasket 96 may also have mounting apertures 98 corresponding in number to and size of the mounting apertures 94 of the mounting flange 92 for receiving the threaded studs (not shown).

It will be understood that the tank-mounted studs can be replaced with screws or bolts 97 or the like, as shown in FIGS. 5, 6, 8, 10, 11, 19, and 20, that have a head portion 101 (FIG. 10) that presses against the upper support member 90 and a threaded shank portion 99 that extends through the mounting apertures 94A, 94 and threads into the tank wall 15 (FIG. 10). Other means for mounting the transducer 10 to the tank 12 can be used without departing from the spirit and scope of the invention.

The disk-shaped upper support member 90 includes the first upper bore 56 within which the wire grommet 54 is mounted and sealed to prevent the ingress of contaminants outside of the tank 12 from entering into the first sensor tube 18, and into which the upper end 20 of the first tube 18 extends. The upper support member 90 also includes a second upper bore 100 for receiving the upper end 29 of the second tube 25, and a third upper bore 102 for receiving the upper end 31 of the third tube 27. The upper bores 56, 100, and 102 of the upper support member 90 are preferably located in the same position and are of the same size as the respective lower bores 62, 64, and 66 of the lower support members 24A and 24B. The bores in each upper support member can be of the same diameter or cross dimension or may be of different diameters or cross dimensions depending on the outer diameters or cross dimensions of the tubes 18, 25, and 27. However, by constructing the upper and lower support members with the same features for receiving the tubes 18, 25 and 27, the tubes are interchangeable and easily replaceable as well as the upper support member 90 and lower support members 24A, 24B. As with the second and third lower bores, the second and third upper bores 100 and 102, respectively, are normally in fluid communication with the contents of the tank so that the liquid can be withdrawn and returned to the tank.

However, it will be understood that in some tanks, where heating of the contents within the tank may be needed, such as in the afore-mentioned DEF tanks, the second and third tubes may be in fluid communication with each other only, and thus sealed against the contents of the tank, to permit antifreeze or other liquids to flow through the second and third tubes in the tank and back out again, thereby warming the contents of the tank while maintaining isolation of the antifreeze or other liquids therefrom.

As best shown in FIGS. 11-17, the mounting head portion 75 further includes a connecting body 110 that protrudes above and below the upper support member 90. The connecting body 110 has a lower first connecting portion 112 that extends downwardly from the support member 90 and an upper second connecting portion 114 that extends upwardly from the upper support member 90.

The lower first connecting portion 112 preferably includes mounting collars 116, 118, and 120 that extend downwardly from a lower surface 121 (FIGS. 9, 11, and 15) of the upper support member 90 and are coincident with the first, second and third upper bores 56, 100, and 102, respectively, for receiving the first, second and third tubes 18, 25, and 27 (see FIGS. 3, 5, and 6), respectively. Although the lower mounting collars 116, 118, and 120 are shown as a unitary structure with the second connecting portion 114 of the connecting body 110, it will be understood that the mounting collars can be formed separately and connected thereto through well-known connecting means. The tubes 18, 25, and 27 can be connected to their respective lower mounting collars in any known manner, such as press-fitting, welding, adhesive bonding, clamping, combinations thereof, and so on.

As previously described, the invention is not limited to three tubes, and thus not limited to three lower mounting collars, as more or less can be provided without departing from the spirit and scope of the invention. Moreover, the invention is not limited to the particular shape or configuration of the lower mounting collars as shown. Accordingly, the first connecting portion can be of any suitable configuration for receiving one or more tubes located inside the tank when the mounting head assembly is connected thereto.

Figure 18:
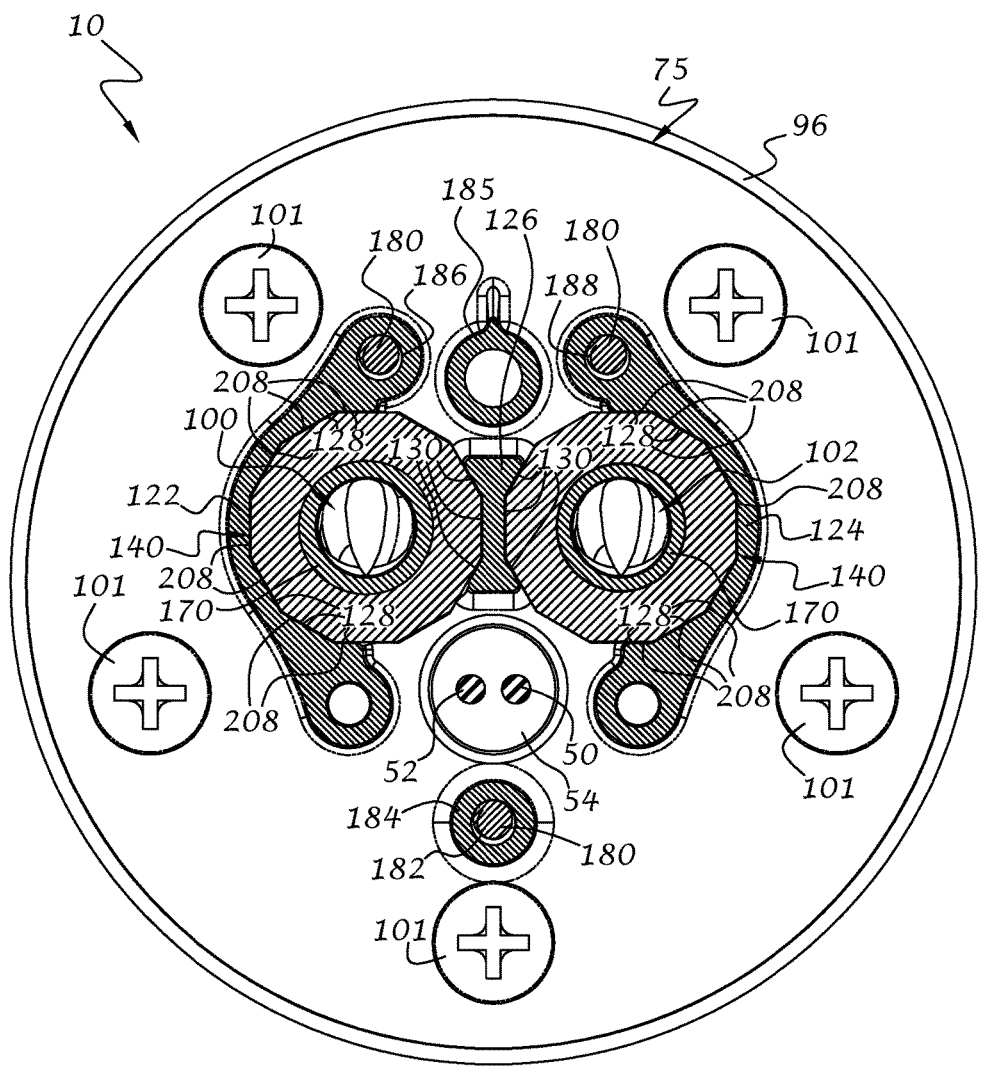
FIG. 18 is a sectional view thereof taken along line 18-18 of FIG. 9.

Referring now to FIGS. 7, 7A, and 11-18, the upper second connecting portion 114 preferably includes first restraining features, shown here as multi-faceted wall structure 122 partially surrounding the second upper bore 100, a second multi-faceted wall structure 124 partially surrounding the third upper bore 102, and a third or central multi-faceted wall structure 126 located between the first and second upper bores 100, 102. The first, second and third wall structures extend upwardly from the upper surface 92 of the upper support member 90. The first and second wall structures are preferably mirror images of each other and each includes a plurality of upright flat faces 128. The third wall structure 126 also includes upright flat faces 130 on one side thereof and a corresponding number of similar upright flat faces 130 on an opposite side thereof. The first restraining features also include a first multi-faceted outer depression 134 formed in the upper surface 92 that surrounds the upper bore 100. Likewise, a second multi-faceted outer depression 136 is formed in the upper surface 92 and surrounds the upper bore 102. The depressions 134, 136 also preferably include the first restraining features in the form of flat upright surfaces 138 that correspond with the flat upright surfaces of their respective wall structures so that, as shown in FIGS. 7 and 18 for example, a multi-faceted hose fitting base 140 associated with a tube connector 142A, 142B, or 144 fits within each depression 134 and 136 and can be removed and adjusted to change the angular orientation of one or more tube connectors, as will be described in greater detail below.

As best shown in FIGS. 7A, 9, 11, and 14, inner depressions or grooves 148 and 150 surround each upper bore 100 and 102, respectively, of the upper support member 90. The grooves 148 are annular in shape for receiving O-rings 152 (FIGS. 9 and 11) or other sealing elements. The O-rings 152 are compressed into the grooves 148, 150 of the support member 90 by the hose fitting base 140 of the hose fittings 142A, 142B, and/or 144 when assembled together so that the hose fittings are sealed against leakage to the support member 90. The O-rings 152 or similar sealing means are especially advantageous in that they permit the hose fittings and their associated hose fitting bases to be removed and rotated to a different orientation and/or replaced with other hose fittings while assuring that the hose fittings will be sealed with the support member 90 in a consistent manner.

In order to mount the hose fitting bases 140 in sealing engagement with the support member 90, a top plate 154, shown best in FIGS. 7, 7A, 8, and 11, is provided. The top plate 154 includes a plate-like body 156 with an outer periphery 158 similar in shape to the outer peripheries 160 and 162 of the first and second wall structures 122 and 124, respectively. A first opening 164, a second opening 166, and a third opening 168 extend through the thickness of the top plate 154 and are in coaxial alignment with the first upper bore 56, second upper bore 100, and third upper bore 102, respectively, formed in the support member 90. The first opening is of sufficient size to permit passage of the grommet 54 (FIG. 7) therethrough, while the second and third openings 166, 168 are of sufficient size to allow the upright sections 170 of the hose fittings 142A, 142B, and/or 144 as well as the upright section 172 of the hose fitting 144 to pass therethrough.

Apertures 174, 176, and 178 also extend through the top plate 154 for receiving fasteners 180 (FIG. 7). The fasteners 180 are preferably threaded fasteners that extend through the apertures 174, 176, and 178 and thread into a first threaded aperture 182 formed in an upright boss 184 that in turn extends upwardly from the top surface 92 of the support member 90, as well as a second threaded aperture 186 formed in the first wall structure 122 and a third threaded aperture 188 formed in the second wall structure 124, for securing the top plate 154 to the upper second connection portion 114 during assembly. In so doing, the base connectors 140 are also retained between the top plate 154 and the support member 90 within the boundaries of the restraining features, e.g. the first, second and third wall structures 122, 124, and 126, as well as the first and second outer multi-faceted depressions 134 and 136, respectively, while compressing against the O-rings 152 to thereby seal the components against leakage as previously described. A second upright boss 185 extends from the top surface 92 and has a bore 187 for use as a vent, or may be combined with a one-way valve for pressure relief inside the tank. It will be understood that the boss 185 can be eliminated without departing from the spirit and scope of the invention.

Referring now to FIGS. 7, 7A, 7B, 7C and 18-20, the hose fittings 142A and 142B are preferably identical in construction and each preferably includes the upright section 170 fixed at a lower end thereof to the hose fitting base 140 and a hose connecting section 190 extending at an angle from an upper end of the upright section 170. Both the hose connecting section 190 and upright section 170 are preferably integrally formed and connected to an opening 192 in the base 140 through any known connection means, such as press-fitting, interference fitting, surface welding, adhesive bonding, combinations thereof, and so on. As shown, an annular barb 194 is formed on the hose connecting section 190 for receiving a hose or the like (not shown) associated with the system or machine to which the tank is connected.

In accordance with a further embodiment of the invention, the hose fittings 142A, 142B, including the base 140, upright section 170, and hose connecting section 190 are integrally formed during manufacture, such as by machining, die-casting, injection molding, and so on. In any event, the upright section 170 and hose connecting section 190 are tubular in shape and include a conduit 196 through which fluid can be withdrawn from or returned to the tank.

The hose fitting 144 is similar in construction to the hose fittings 142A and 142B, with the exception that the diameter of the upright section 172, the hose connecting section 198, and the barb 200 are larger in diameter than the corresponding sections and barb of the hose fittings 142A and 142B. Preferably, the outer shape and dimension of the base 140 are the same for all of the hose fittings 142A, 142B, and 144 so that they are interchangeable. However, it will be understood that the connecting bases 144 can be of different sizes, as long as the corresponding structure on the upper support member 90 is arranged to accommodate the different sizes.

It will be further understood that the invention is not limited to barb connections as shown, but may include more barbs, as well as any connection, fitting, clamp, or configuration for connecting the hose without departing from the spirit and scope of the invention. Moreover, although the upright section 172 and hose connecting section extend at right angles in the drawings, it will be understood that the sections can extend at any suitable angle acute or obtuse angle, such as, but not limited to, 45 degrees, 120 degrees, 135 degrees, and so on.

In accordance with a further embodiment of the invention, a plurality of modular or exchangeable hose fittings 142A, 142B, and/or 144 of a variety of different angles, sizes, shapes, hose connecting configurations, and so on, can be provided in a kit form either alone or in combination with the tank mounting member, the tubes, electronics, and so on, as original and/or replacement items to accommodate tank and/or machine or system requirements, including space limitations, hose sizes and directions, and so on. It will be understood that the term "hose" as used herein refers to any line, conduit, tubing, piping, and so on, whether flexible, semi-rigid or rigid, as well as any other means for holding and transporting fluids, including gases and liquids.

With additional reference to FIG. 7C, the hose fitting bases 140 are generally spool-shaped with second restraining features, shown here as a multi-faceted lower flange 202 and a multi-faceted upper flange 204 separated by a cylindrical body 206. The upright faces 208 on the lower flange 202 and the upper flange 204 preferably correspond in number, size and shape to the upright faces 138 (FIG. 14) of the first multi-faceted outer depression 134 surrounding the upper bore 100 and the second multi-faceted outer depression 136 surrounding the upper bore 102, as well as the corresponding upright faces 128 of the first and second wall structures and the upright faces 130 of the third wall structure 126, so that the hose fitting bases 140 can be rotated about their central axes, and thus the central axes of the bores 100 or 102, so that the hose fittings can be adjusted during assembly, as shown in FIGS. 19-21, for pointing in various directions as dictated by a particular tank configuration and other requirements and/or needs.

Figure 19:
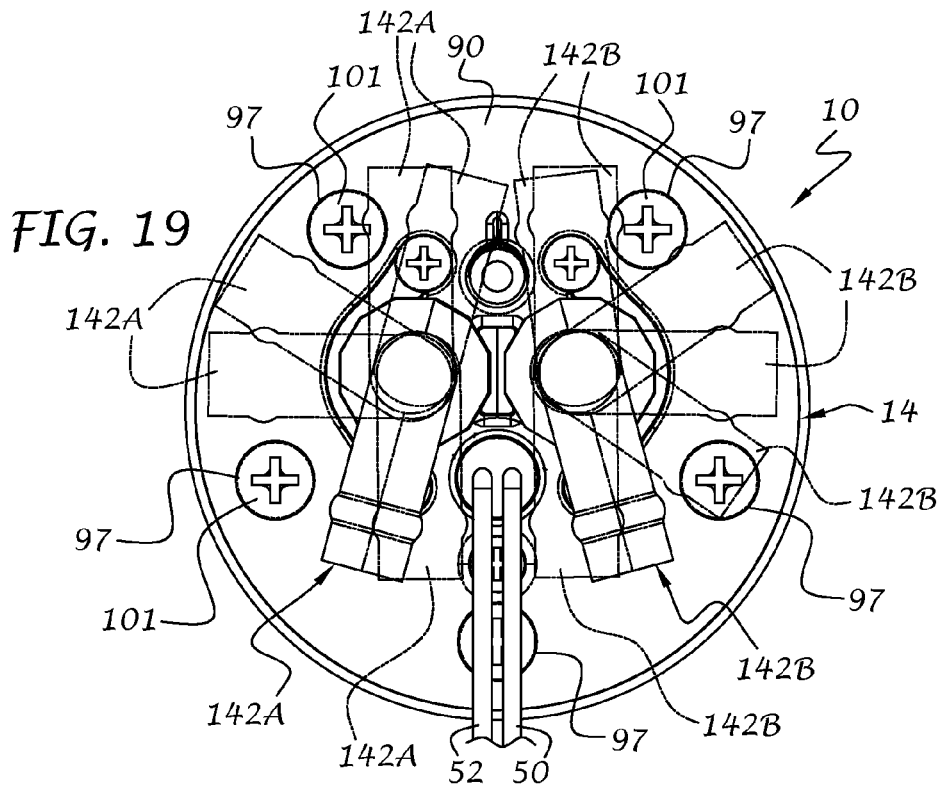
FIG. 19 is a top plan view of the liquid level transducer showing some of the different tube connector orientations in accordance with the invention.
Figure 20:
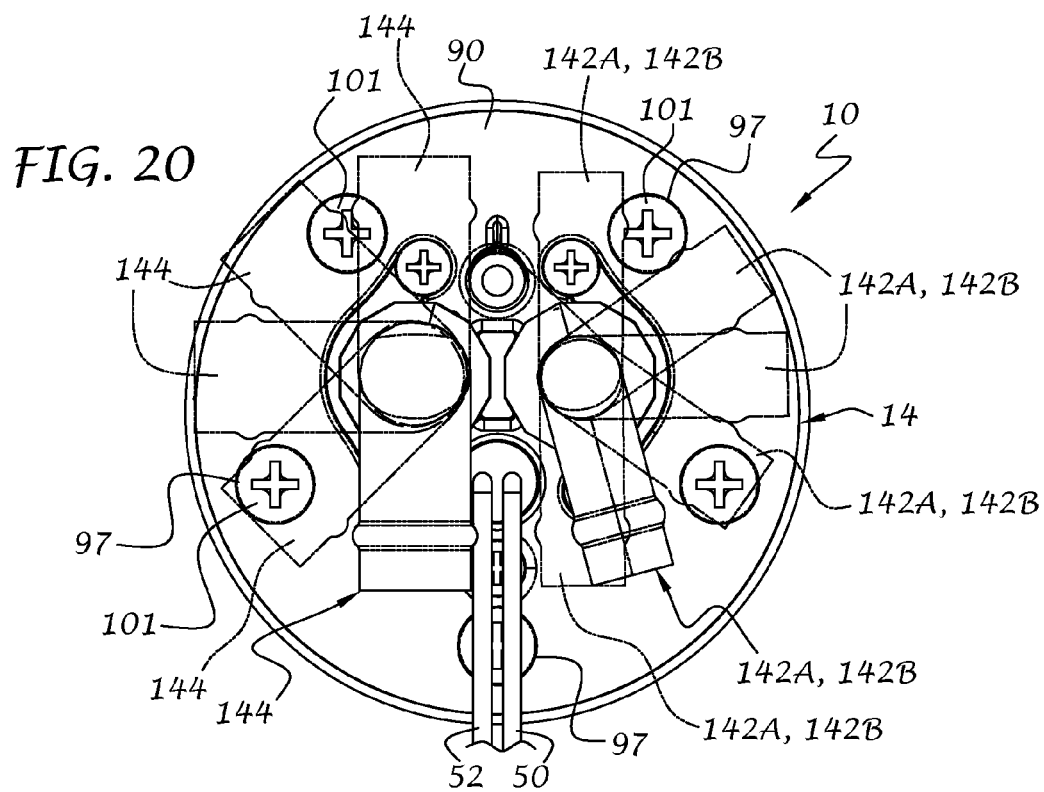
FIG. 20 is a top plan view similar to FIG. 19 showing a different tube connector configuration showing some of the different orientations in accordance with the invention.
Figure 21:
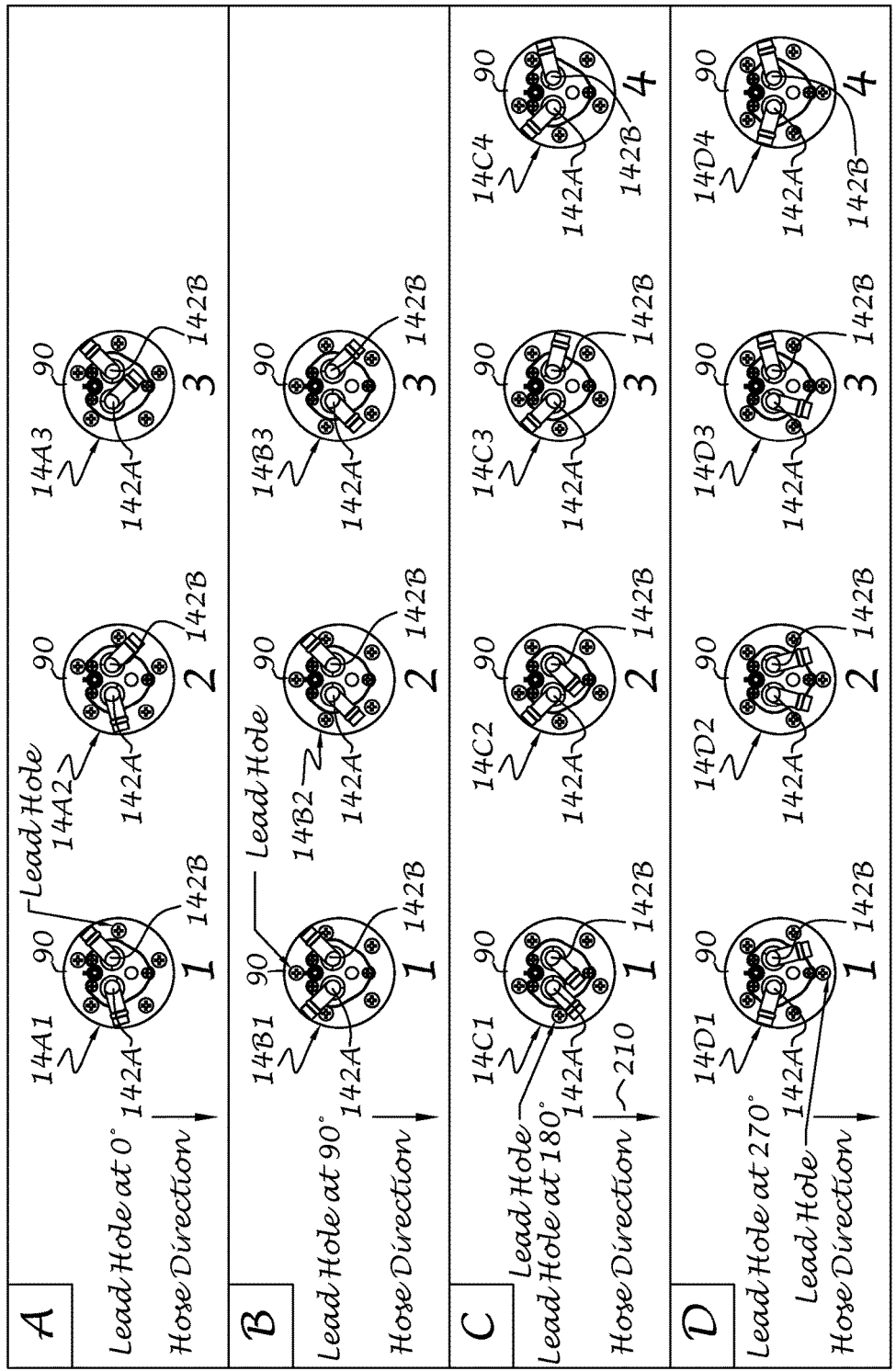
FIG. 21 is a chart illustrating exemplary tube connector configurations with a lead screw or mounting hole of the mounting head at different orientations.

Turning now to FIGS. 19-21, the particular number of upright faces dictates the number of discrete angular positions of the hose connecting sections 190 and 198 of the hose fittings 190 and/or 198, as shown for example by the exemplary positions of the hose fittings in in phantom line in FIGS. 19 and 20 and the exemplary positions shown in FIG. 21.

Referring now to FIG. 21, a chart illustrating different exemplary tube connector configurations for the mounting head assembly 14 is shown. The mounting head configurations associated with each row are based on a relative angular position of a lead mounting hole 94A of the disk-shaped support member 90 at 0° (row A), 90° (row B), 180° (row C), and 270° (row D) for example, with respect to a horizontal line (as viewed in FIG. 21) perpendicular to a hose direction, as denoted by arrow 210. The hose direction represents the final direction in which one or more hoses will extend when connected between the hose connectors 142A, 142B, and/or 144 and a remote location of the machine or system associated with the tank for transferring fluid between the tank and the remote location. In row A, three different configurations of the mounting head assembly are shown and denoted by 14A1, 14A2, and 14A3. Each configuration shows the connectors 142A and 142B extending in different directions. Likewise, in Row B, a different configuration for the mounting head assembly is shown, as denoted by 14B1, 14B2, and 14B3. These configurations are different from each other and from the row A configurations. Likewise, row C shows four different configurations as denoted by 14C1, 14C2, 14C3, and 14C4, which are different from each other and the previous configurations. Finally, row D shows four different configurations as denoted by 14D1, 14D2, 14D3, and 14D4, which are also different from each other and the previous configurations. It will be understood, therefore, that a wide variety of different configurations for the mounting head assembly 14 are possible, and that such configurations are not limited to what has been shown by way of example only. It will be further understood that each of the configurations can use other tube connectors, such as tube connector 144, having different sizes, shapes, connecting means, and so on, as previously described. Accordingly, the present invention can accommodate a wide variety of different hose connecting requirements for a wide variety of different tanks, machines, and systems, while providing a single mounting head with adjustable tube connectors, thereby reducing manufacturing and other costs associated with prior art single configuration mounting heads.

Although a particular number of faces have been shown for the restraining members, it will be understood that more or less faces can be provided without departing from the spirit and scope of the invention to provide more or less discrete angular positions for the hose fittings 190 and/or 198.

Moreover, it will be understood that the number of faces on the walls and/or outer depressions do not need to correspond in number to the faces on the bases 140. In addition, although two sets of faces are shown on the bases 140, i.e. on the upper and lower flanges, it will be understood that the faces can be continuous, or one set of faces can be eliminated, or other arrangements and configurations can be made without departing from the spirit and scope of the invention, as long as the bases 140, and thus the hose fittings, can be adjusted to different angular positions, as shown for example in FIGS. 19-21.

Furthermore, it will be understood that the present invention encompasses more than the first and second restraining features in the form of flat upright faces as shown, as other shapes can be provided including, but not limited to, hexalobular-shaped (Torx™-shaped), pentalobular-shaped or any other lobular shape, convex and/or concave surfaces, as well as other symmetrical or asymmetrical faces and/or face shapes with any number of suitable faces of the same or varying shapes or configurations, so long as one or more of the hose fittings 142A, 142B, and/or 144 can be adjusted to different orientations or positions during assembly or re-assembly to accommodate the varying requirements or needs of a wide variety of tanks, containers, and the machines or systems with which they are associated.

Moreover, where it is desirous to provide only withdrawal and return tubes, such as when the contents of the tank are monitored through a separate liquid level device or when it is not necessary to measure liquid level, the sensor tube 18 and/or its associated components may be removed and a modular cap (not shown) can enclose the opening in the mounting head assembly 14 associated with the liquid level measurement portion. Furthermore, the sensor tube 18 can be removed or otherwise function as a further liquid withdrawal/return conduit and can thus be used in conjunction with one of the afore-mentioned modular tube connectors. Accordingly the modular components of the present invention and the arrangement of the mounting head assembly 14 are adaptable to a wide variety of configurations.

In this manner, the same basic components of the present invention can be used to build a wide variety of different liquid level transducers and/or liquid withdrawal/return configurations in accordance with OEM and aftermarket needs without the necessity of having a separately constructed transducer that is useful for only a single tank configuration as in the prior art. Accordingly, the modular components together with the mounting head construction of the present invention eliminate the need to manufacture different transducers or mounting heads for every required tank configuration in the industries where such devices are used.

It will be understood that the mounting head 14 is not limited to a flange mounting arrangement as shown, as other means for mounting the liquid level transducer 10 to a tank or other container can be used, including NPT type threads, clamping, welding, and so on, without departing from the spirit and scope of the invention. It will be further understood that the mounting head can be constructed of metal, such as brass, aluminum, stainless steel, and so on, or other materials such as plastic or ceramic.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. By way of example, although the restraining features of the hose connector bases are shown as extending around the outer periphery of the flanges and the inner periphery of the upper connector portions of the support member, the restraining features may be located on the bottom of the base member and corresponding restraining features may be located on the top of the support member or the like for mutual engagement so that the hose connectors can be adjusted or oriented to a plurality of fixed angular positions with respect to the central axis of the corresponding bore. Accordingly, the location, orientation, size, number, shape, configuration, and so on, of the complementary restraining features can greatly vary in accordance with the invention. It is understood, therefore, that the invention is not limited to the particular embodiments disclosed, but is intended to cover all modifications within the spirit and scope of the present invention as defined by the appended claims.

What is claimed is:

1. A mounting head assembly adapted for connection to a tank for conducting liquid between the tank and a location remote from the tank, the mounting head assembly comprising:
a support member adapted for connection to the tank, the support member having a first bore extending therethrough for conducting the liquid between the tank and the remote location, the first bore having a first central axis;
a connecting body including an upper connecting portion with a first set of first restraining features comprising a first multi-faceted wall structure having first upright faces that adjoin one another and at least partially surround the first bore, each first face defining a unique angular position with respect to the central axis;
a first hose connector including a first base portion and a first connector portion extending at a first angle with respect to the first base portion;
the first base portion including a first set of second restraining features comprising a second multi-faceted wall structure having second upright faces that adjoin one another and circle around the first base portion, a plurality of the second upright faces engaging a plurality of the first upright faces so that the connector portion can be oriented in one of a plurality of angular positions with respect to the central axis and fixed in place during assembly; and
a top plate connected to the upper connecting portion, the top plate having a first opening in alignment with the first bore for receiving the first connector portion;
wherein the first opening is smaller than the first base portion to thereby retain the first hose connector to the support member.

2. A mounting head assembly according to claim 1, and further comprising:
a second hose connector including a second base portion and a second connector portion extending at a second angle with respect to the second base portion;
the second base portion including a second set of second restraining features including a third multi-faceted wall structure having third upright faces that adjoin one another and circle around the second base portion, a plurality of the third upright faces engaging a plurality of the first faces for cooperating with the first set of first restraining features so that the first and second hose connectors are interchangeable with respect to the upper connection portion.

3. A mounting head assembly according to claim 2, wherein the connector portions of the first and second hose connectors are of different sizes for receiving different sized hoses for conducting liquid between the tank and a location remote from the tank.

4. A mounting head assembly according to claim 2, wherein the first and second hose connectors further comprise respective first and second upright portions extending between their related base portion and connector portion, with the first and second upright portions and their respective first and second connector portions extending at the first and second angles, respectively.

5. A mounting head assembly according to claim 2, wherein the support member comprises a second bore extending through the support member, the second bore including a second central axis and a second set of first restraining features comprising a fourth multi-faceted wall structure having fourth upright faces that adjoin one another and at least partially surround the second bore, each fourth face defining a unique angular position with respect to the second central axis for cooperating with at least one of the first and second sets of first restraining features so that the first and second hose connectors can be oriented independently about the first and second central axes, respectively, at a plurality of discrete angular positions and fixed in place at one of the plurality of discrete angular positions during assembly, such that the first connector portion extends at a first angular position and the second connector portion extends at a second angular position;
the top plate further having a second opening in alignment with the second bore for receiving the second connector portion;
wherein the second opening is smaller than the second base portion to thereby retain the first hose connector to the support member.

6. A mounting head assembly according to claim 5, wherein the first and second angular positions are different.

7. A mounting head assembly according to claim 5, wherein the first and second angular positions are the same.

8. A transducer for determining the level of liquid within a tank comprising the mounting head assembly of claim 5, and further comprising:
a third bore extending through the mounting member;
a probe assembly extending from the connecting body and being adapted to extend into the tank when the mounting head assembly is connected thereto, the probe assembly comprising:
a first tube extending from the connecting body for fluid communication with the first bore and the first hose connector;
a second tube extending from the connecting body for fluid communication with the second bore and the second hose connector;
a third tube extending from the connecting body for fluid connection with the third bore; and
a sensor assembly associated with the third tube for electronically detecting the level of liquid within the tank, the sensor assembly communicating electrical signals reflective of the liquid level through the third bore to thereby monitor the liquid level condition of the tank.

9. A transducer according to claim 8, wherein the sensor assembly comprises:
a sensor board located in the third tube with a plurality of reed switches positioned along a length thereof; and
a float at least partially surrounding the third tube for sliding movement therealong, the float including at least one magnet such that a magnetic force from the magnet is directed toward the sensor board to thereby cause one of a positive opening and closing effect of one or more of the reed switches when the float is in the vicinity thereof.

10. A transducer according to claim 8, and further comprising:
at least one lower support member having first, second and third lower bores for receiving a lower end of the first, second and third tubes, respectively.

11. A transducer according to claim 10, wherein the first and second lower bores are open to the contents of the tank such that the first and second tubes and their associated first and second hose connectors function as liquid withdrawal and return conduits, respectively, and the third lower bore is sealed from the contents of the tank to isolate the sensor assembly therefrom.

12. A transducer according to claim 11, wherein the at least one lower support member comprises one of a first lower support member with a first configuration and a second lower support member with a second configuration, each configuration having the first, second and third lower bores for receiving the lower ends of the first, second and third tubes, respectively;
the first and second lower support members being interchangeable, with the first configuration comprising the first and second bores extending vertically, and the second configuration comprising the first and second bores having first bore sections that extend vertically and second bore sections that extend at an angle to the first bore sections.

13. A mounting head assembly according to claim 5, wherein the restraining features are configured for independently orienting each of the first and second hose connectors in one of at least four different angular positions.

14. A mounting head assembly according to claim 1, wherein the restraining features are configured for orienting the hose connector in one of at least four different angular positions.

15. A mounting head assembly adapted for connection to a tank for conducting liquid between the tank and a location remote from the tank, the mounting head assembly comprising;
    a support member adapted for connection to the tank, the support member having a first bore extending therethrough for conducting the liquid between the tank and the remote location, the first bore having a first central axis;
    a connecting body including an upper connecting portion with a first set of first restraining features at least partially surrounding the first bore;
    a first hose connector including a first base portion and a first connector portion extending at a first angle with respect to the first base portion;
    the first base portion including a first set of second restraining features for cooperating with the first set of first restraining features of the connecting body so that the connector portion can be oriented in one of at least a first angular position and a second angular position with respect to the central axis and fixed in place during assembly;
    a second hose connector including a second base portion and a second connector portion extending at a second angle with respect to the second base portion;
    the second base portion including a second set of second restraining features for cooperating with the first set of first restraining features so that the first and second hose connectors are interchangeable with respect to the upper connection portion;
    the first and second hose connectors further comprising respective first and second upright portions extending between their related base portion and connector portion, with the first and second upright portions and their respective first and second connector portions extending at the first and second angles, respectively;
    each of the first and second sets of restraining features comprising a plurality of first surfaces on the upper connecting portion and a plurality of second surfaces on the base portion for engaging the first surfaces and preventing relative rotational movement between the hose connectors and the connecting body when assembled; and
    a top plate secured to the upper connecting portion, the top plate having first and second openings in alignment with the first and second bores, respectively, for receiving the first and second upright portions, respectively;
    wherein the first and second openings are smaller than the first and second base portions, respectively, to thereby retain the first and second hose connectors to the support member.

16. A mounting head assembly according to claim 15, and further comprising an annular seal positioned between each of the first and second base members and the upper connecting portion to thereby seal the first and second hose connectors to the support member.

17. A method of assembling a mounting head adapted for connection to a tank for conducting liquid between the tank and a location remote from the tank, the method comprising:
    providing a support member adapted for connection to the tank, the support member having a first bore extending therethrough for conducting the liquid between the tank and the remote location, the first bore having a first central axis;
    providing an upper connecting portion with a first set of first restraining features comprising a first multi-faceted wall structure having first upright faces that adjoin one another and that at least partially surround the first bore, each first face defining a unique angular position with respect to the central axis;
    providing a first hose connector including a first base portion and a first connector portion extending at an angle with respect to the first base portion;
    providing a first set of second restraining features on the first base portion comprising a second multi-faceted wall structure having second upright faces that adjoin one another and circle around the first base portion, a plurality of the second upright faces for engaging a plurality of the first upright faces for restraining relative angular movement between the first hose connector and the support member;
    installing the first hose connector on the support member by:
        adjusting the first hose connector such that the second restraining features are in alignment with the first restraining features in one of a plurality of alignment conditions so that the first connector portion is positioned in a corresponding one of a plurality of angular positions with respect to the support member; and
        fixing the first hose connector in the one angular position connecting a top plate to the upper connecting portion, the top plate having a first opening in alignment with the first bore for receiving the first connector portion, with the first opening being smaller than the first base portion to thereby retain the first hose connector to the support member.

18. A method according to claim 17, and further comprising:
    providing the support member with a second bore extending therethrough for conducting the liquid between the tank and the remote location, the second bore having a second central axis;
    providing a second set of first restraining features that at least partially surround the first bore including a third multi-faceted wall structure having third upright faces that adjoin one another and at least partially surround the second bore;
    providing a second hose connector including a second base portion and a second connector portion extending at an angle with respect to the second base portion;
    providing a second set of second restraining features on the second base portion including a fourth multi-faceted wall structure having fourth upright faces that adjoin one another and circle around the second base portion, a plurality of the fourth upright faces for engaging a plurality of the third upright faces for restraining relative angular movement between the second hose connector and the support member;
    installing the second hose connector on the support member by:
        adjusting the second hose connector such that the second restraining features of the second base portion are in alignment with the first restraining features associated with the second bore in one of a plurality of second alignment conditions so that the second connector portion is positioned in a corresponding second one of a plurality of second angular positions with respect to the support member; and
        fixing the second hose connector in the second one angular position by providing a second opening in alignment with the second bore for receiving the second connector portion;

wherein the second opening is smaller than the second base portion to thereby retain the second hose connector to the support member.

19. A mounting head assembly adapted for connection to a tank for conducting liquid between the tank and a location remote from the tank, the mounting head assembly comprising:
- a support member adapted for connection to the tank, the support member having a first bore extending therethrough for conducting the liquid between the tank and the remote location, the first bore having a first central axis;
- a connecting body including an upper connecting portion with first restraining features at least partially surrounding the first bore;
- a hose connector including a base portion, a connector portion extending at an angle with respect to the base portion, and an upright portion extending between the base portion and the connector portion;
- the base portion including second restraining features for cooperating with the first restraining features so that the connector portion can be oriented in one of at least a first angular position and a second angular position with respect to the central axis; and
- a top plate connected to the upper connecting portion, the top plate having an opening in alignment with the first bore for receiving the first upright portion, the opening being smaller than the base portion to thereby retain the hose connector with respect to the support member.

\* \* \* \* \*